United States Patent
Egner et al.

(10) Patent No.: US 9,807,613 B2
(45) Date of Patent: Oct. 31, 2017

(54) COLLABORATIVE METHOD AND SYSTEM TO IMPROVE CARRIER NETWORK POLICIES WITH CONTEXT AWARE RADIO COMMUNICATION MANAGEMENT

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 221 days.

(21) Appl. No.: 14/532,455

(22) Filed: Nov. 4, 2014

(65) Prior Publication Data

US 2015/0056960 A1 Feb. 26, 2015

Related U.S. Application Data

(63) Continuation-in-part of application No. 14/532,343, filed on Nov. 4, 2014, which is a continuation-in-part of application No. 14/099,686, filed on Dec. 6, 2013, now Pat. No. 9,119,039, which is a continuation-in-part of application No. 13/604,906, filed on Sep. 6, 2012, now Pat. No. 9,088,859.

(51) Int. Cl.
*H04W 12/08* (2009.01)
*H04W 4/02* (2009.01)
*H04W 48/06* (2009.01)

(52) U.S. Cl.
CPC ............. *H04W 12/08* (2013.01); *H04W 4/02* (2013.01); *H04W 4/027* (2013.01); *H04W 4/028* (2013.01); *H04W 48/06* (2013.01)

(58) Field of Classification Search
CPC ... H04W 12/08; H04W 4/02; H04W 28/0236; H04L 47/122; H04L 47/24
See application file for complete search history.

(56) References Cited

U.S. PATENT DOCUMENTS

| | | | |
|---|---|---|---|
| 7,013,145 B1 | 3/2006 | Centore, III | |
| 8,666,048 B2 | 3/2014 | Beerse et al. | |
| 9,088,859 B2 | 7/2015 | Egner | |
| 9,119,039 B2 | 8/2015 | Egner | |
| 9,143,926 B2 | 9/2015 | Egner | |
| 9,167,591 B2 | 10/2015 | Egner | |
| 9,210,714 B2 | 12/2015 | Egner | |
| 9,313,603 B2 | 4/2016 | Egner | |
| 2002/0120766 A1* | 8/2002 | Okajima | H04L 12/12 709/232 |
| 2004/0192341 A1 | 9/2004 | Wang et al. | |
| 2005/0041696 A1 | 2/2005 | Pekonen | |
| 2005/0215290 A1 | 9/2005 | Wakabayashi et al. | |
| 2006/0088004 A1 | 4/2006 | Casey | |

(Continued)

*Primary Examiner* — David Oveissi

(74) *Attorney, Agent, or Firm* — Prol Intellectual Property Law, PLLC; H. Kenneth Prol

(57) ABSTRACT

An information handling system includes a wireless adapter that communicates with a network policy engine at a service provider to provide feedback on a network access policy of the service provider, an application processor that executes instructions of a context aware radio resource management system that determines one or more optimal wireless link options for communicating with a recipient user via a wireless link from among communication link options available from the service provider.

20 Claims, 21 Drawing Sheets

(56) References Cited

U.S. PATENT DOCUMENTS

| | | | |
|---|---|---|---|
| 2006/0268849 A1 | 11/2006 | Larsson et al. | |
| 2007/0060130 A1 | 3/2007 | Gogic et al. | |
| 2008/0125959 A1* | 5/2008 | Doherty | G06F 17/30241 |
| | | | 701/532 |
| 2008/0186901 A1* | 8/2008 | Itagaki | H04W 92/18 |
| | | | 370/315 |
| 2009/0086744 A1 | 4/2009 | Huang | |
| 2009/0181695 A1 | 7/2009 | Wirola et al. | |
| 2009/0240808 A1 | 9/2009 | Chen | |
| 2009/0279502 A1 | 11/2009 | Zheng et al. | |
| 2009/0319348 A1 | 12/2009 | Khosravy et al. | |
| 2010/0202376 A1 | 8/2010 | Zhu et al. | |
| 2010/0220665 A1 | 9/2010 | Govindan et al. | |
| 2011/0143761 A1 | 6/2011 | Uusitalo et al. | |
| 2011/0171960 A1 | 7/2011 | Hershey | |
| 2011/0264726 A1* | 10/2011 | Zabawskyj | H04L 12/14 |
| | | | 709/203 |
| 2012/0057569 A1 | 3/2012 | Xie et al. | |
| 2012/0166622 A1 | 6/2012 | Draznin | |
| 2013/0023274 A1* | 1/2013 | Meredith | H04W 48/18 |
| | | | 455/450 |
| 2013/0286868 A1* | 10/2013 | Oyman | H04W 24/06 |
| | | | 370/252 |

* cited by examiner

COLLABORATIVE METHOD AND SYSTEM TO IMPROVE CARRIER NETWORK POLICIES WITH CONTEXT AWARE RADIO COMMUNICATION MANAGEMENT

CROSS REFERENCE TO RELATED APPLICATIONS

This application is a continuation-in-part of U.S. patent application Ser. No. 14/532,343, entitled Method and Apparatus for a Unified Communication System Involving Context Aware Radio Communication Management for Multiple User Devices, filed on Nov. 4, 2014, which is a continuation-in-part of U.S. patent application Ser. No. 14/099,686, entitled Method and Apparatus for Connection Context Aware Radio Communication Management for a Predictive Mobile Path," filed on Dec. 6, 2013, which is a continuation-in-part of U.S. patent application Ser. No. 13/604,906, entitled "Method and Apparatus for Connection Context Aware Radio Communication Management," filed on Sep. 6, 2012, the disclosures of which are hereby expressly incorporated by reference in its entirety.

Related subject matter is contained in the following co-pending applications:

U.S. patent application Ser. No. 14/099,698, entitled "Method and Apparatus for Predicting Mobile Device Wireless Link Quality of Service Requirements Along a Predicted Path," filed on Dec. 6, 2013, by Will A. Egner et al., and assigned to the assignee hereof.

U.S. patent application Ser. No. 14/099,715, entitled "Method and Apparatus for Determining Optimized Wireless Link Selection for a Mobile Device Along a Predicted Path," filed on Dec. 6, 2013, by Will A. Egner et al., and assigned to the assignee hereof.

U.S. patent application Ser. No. 14/160,275, entitled "Method and Apparatus for Context Aware Management of Location Optimization of Virtual Machines for Mobility and Real-time Enterprise Applications," filed on Jan. 21, 2014, by Will A. Egner et al., and assigned to the assignee hereof.

U.S. patent application Ser. No. 14/541,562, entitled "Method and System for Optimizing Shared Spectrum Utilizing Context Aware Radio Communication Management," filed Nov. 14, 2014, invented by Will A. Egner et al., and assigned to the assignee hereof.

FIELD OF THE DISCLOSURE

The present disclosure generally relates to a method and apparatus for leveraging a radio resources communication management system to notify and to recommend to wireless service providers better performing wireless link options to potentially modify service provider network access policy enforcement upon initialization of end-to-end communication via the network wireless links supported by the service providers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Currently when a user accesses a data or communication network of a service provider, the service provider drives selection of their own radio assets (LTE, HSPA, UMTS, WI-FI, etc.). This is done via a network connection Policy Control Enforcement Engine (PCEF). The service provider PCEF enforces its own defined rules and policies about selection of radio assets for connection of a user mobile device in end-to-end communications. This selection may not necessarily be optimal with respect to the user's experience and connection quality. Data, voice and other communications may be provided more efficiently with selection of wireless links made in concert with wireless service providers or carriers.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
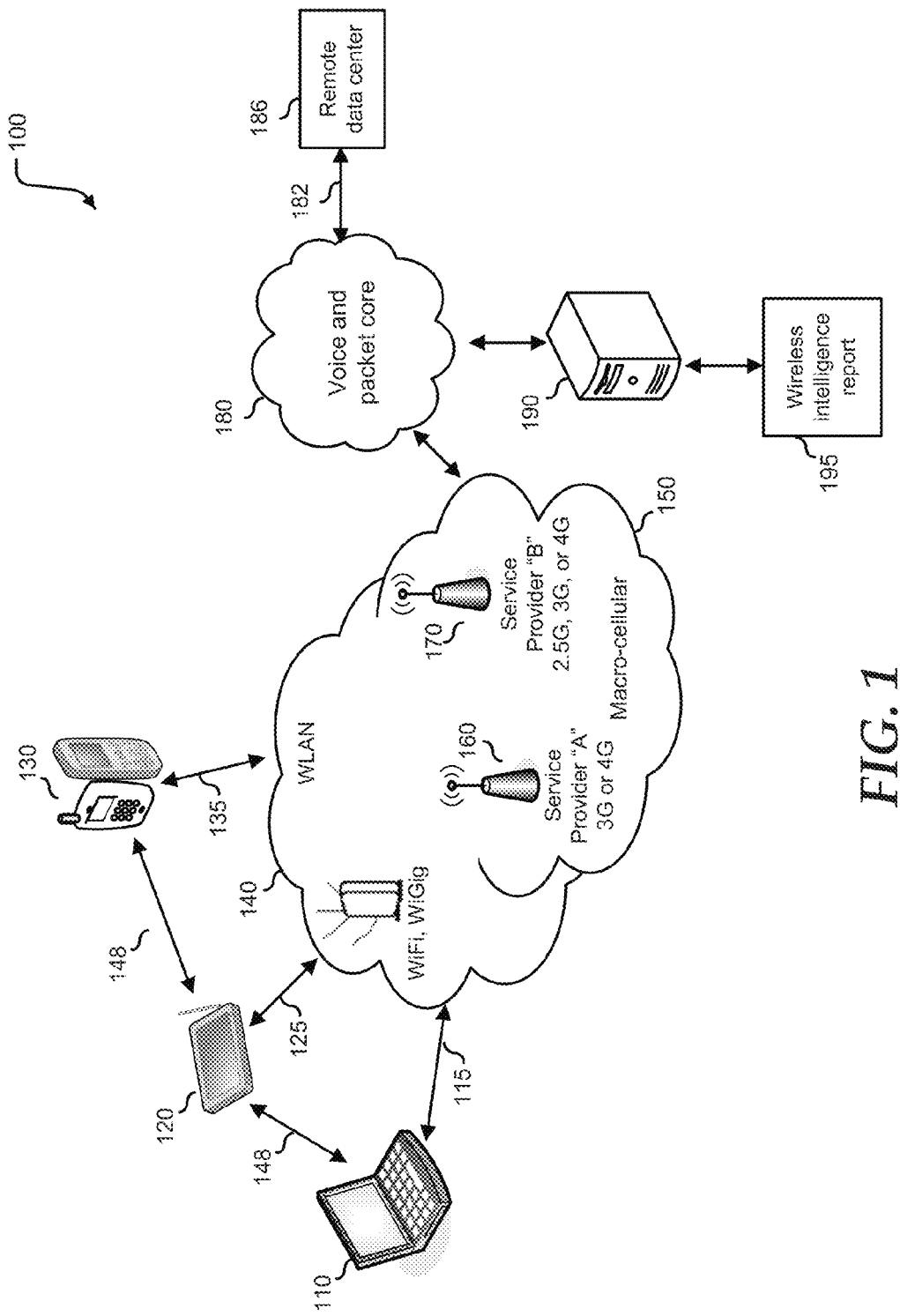
FIG. 1 is a block diagram of a network environment offering several communication protocol options according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a mobile information handling system, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, network 100 includes networked mobile information handling systems 110, 120, and 130, wireless network access points, and multiple wireless connection link options. Systems 110, 120, and 130 represent a variety of computing resources of network 100 including client mobile information handling systems, data processing servers, network storage devices, local and wide area networks, or other resources as needed or desired. As specifically depicted, systems 110, 120, and 130 may be a laptop computer, tablet computer, or smartphone device. These user mobile information handling systems 110, 120, and 130, may access a wireless local area network 140, or they may access a macro-cellular network 150. For example, the wireless local area network 140 may be the wireless local area network (WLAN), a wireless personal area network (WPAN), or a wireless wide area network (WWAN). Since WPAN or Wi-Fi Direct Connection 148 and WWAN networks can functionally operate similar to WLANs, they may be considered as wireless local area networks (WLANs) for purposes herein. Components of a WLAN may be connected by wireline or Ethernet connections to a wider external network. For example, wireless network access points 145 may be connected to a wireless network controller and an Ethernet switch. Wireless communications across wireless local area network 140 may be via standard protocols such as IEEE 802.11 Wi-Fi, IEEE 802.1 1ad WiGig, IEEE 802.15 WPAN or similar wireless network protocols. Alternatively, other available wireless links within network 100 may include macro-cellular connections 150 via one or more service providers 160 and 170. Service provider macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 180 may contain externally accessible computing resources and connect to a remote data center 186. The voice and packet core network 180 may contain multiple intermediate web servers or other locations with accessible data (not shown). Connection 182 between the wireless network 140 and remote data center 186 may be via Ethernet or another similar connection to the world-wide-web, a WAN, a LAN, another WLAN, or other network structure. Such a connection 182 via WLAN access point/Ethernet switch 145 to the external network is a backhaul connection. The access point 145 may be connected to one or more wireless access points in the WLAN before connecting directly to a mobile information handling system or may connect directly to one or more mobile information handling systems 110, 120, and 130. Alternatively, mobile information handling systems 110, 120, and 130 may connect to the external network via base station locations at service providers such as 160 and 170. These service provider locations may be network connected via backhaul connectivity through the voice and packet core network 180.

Remote data center 186 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 110, 120, and 130 allowing streamlining and efficiency within those devices. Similarly, remote data center 186 permits fewer resources to be maintained in other parts of network 100.

In an example embodiment, the cloud or remote data center 186 may run hosted applications for systems 110, 120, and 130. This may occur by establishing a virtual machine application executing software to manage applications hosted at the remote data center 186. Mobile information handling systems 110, 120, and 130 are adapted to run one or more applications locally, and to have hosted applications run in association with the local applications at remote data center 186. The virtual machine application may serve one or more applications to each of user mobile information handling systems 110, 120, and 130. Thus, as illustrated, systems 110, 120, and 130 may be running applications locally while requesting data objects related to those applications from the remote data center 186 via wireless network. For example, an electronic mail client application may run locally at system 110. The electronic mail client application may be associated with a host application that represents an electronic mail server. In another example, a data storage client application such as Microsoft Sharepoint may run on system 120. It may be associated with a host application running at remote data center 186 that represents a Sharepoint data storage server. In a further example, a web browser application may be operating at system 130. The web browser application may request web data from a host application that represents a hosted website and associated applications running at remote data center 186.

To communicate within the network 100, the systems 110, 120, and 130 each have a wireless interface module or wireless adapter, hereinafter referred to as a wireless adapter. System 110 includes a wireless adapter, system 120 includes a wireless adapter, and system 130 includes a wireless adapter. The wireless adapters are operable to provide a wireless radio frequency interface 115, 125, and 135 to transmit and receive voice and data between the respective systems 110, 120, and 130 and one or more external networks via wireless network 140 or 150.

Although 115, 125, and 135 are shown connecting wireless adapters to wireless networks 140 or 150, actual wireless communication may link through a wireless access point 145 or a service provider tower such as that shown with service provider A 160 or service provider B 170. A wireless link may also be made between the wireless adapter and another mobile information handling system in a WPAN or Wi-Fi Direct Connection 148. Since one aspect of the disclosed embodiments involves selection of wireless links by a context aware radio resource management system, no particular wireless link selection is depicted in FIG. 1.

The wireless adapters can represent add-in cards, wireless network interface modules that are integrated with a main board of respective systems 110, 120, and 130 or integrated with another wireless network interface capability, or any combination thereof. In an embodiment the wireless adapters may include one or more radio frequency subsystems including transmitters and wireless controllers for connecting via a multitude of wireless links. In an example embodiment, a mobile information handling system may have a transmitter for Wi-Fi or WiGig connectivity and one or more transmitters for macro-cellular communication. The radio frequency subsystems include wireless controllers to manage authentication, connectivity, communications, power levels for transmission, buffering, error correction, baseband processing, and other functions of the wireless adapters.

The radio frequency subsystems of the wireless adapters may measure various metrics relating to wireless communication. For example, the wireless controller of a radio frequency subsystem may manage detecting and measuring received signal strength levels, bit error rates, signal to noise ratios and other metrics relating to signal quality and strength. In one embodiment, a wireless controller may manage one or more radio frequency subsystems within a wireless adapter. The wireless controller also manages transmission power levels which directly affect radio frequency subsystem power consumption. To detect and measure power consumption by a radio frequency subsystem, the radio frequency subsystem may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated.

The wireless adapters may be capable of connecting via a WLAN 140 or a macro-cellular network (WWAN) 150 and service provider 160 or 170 in a variety of the wireless standards as described above. Each of the wireless adapters for client mobile information handling systems 110, 120, and 130 are uniquely identified on network 100 via one or more unique identifiers permitting authentication and access. For example, the wireless device can each be identified by one or more Subscriber Identity Modules (SIM), one or more of a media access control (MAC) address, an Internet protocol (IP) address, a world wide name (WWN), or another unique identifier such as a user name and password, as needed or desired. Association of a user and a wireless interface module of a user information handling system may be made via communications across a networking control plane. For example, a user information handling system may be associated with a user via communication with a database such as Home Subscriber Server (HSS), Active Directory or similar database. This database may reside in the voice and packet core network 180, at a base station at 160 or 170, or elsewhere in the external network.

The wireless adapters may operate in accordance with any wireless data communication standards. To communicate with wireless local area network 140, standards including IEEE 802.11 WLAN standards, IEEE 802.15 WPAN standards, WWAN such as 3GPP or 3GPP2, or similar wireless standards may be used. The wireless LAN network 140 may provide connectivity via Wi-Fi or WiGig for example. The wireless network 140 may have a wireless mesh architecture in accordance with mesh networks described by the above wireless data communications standards or similar standards. Wireless links 115, 125, and 135 may also connect to the external network via a WPAN, WLAN or similar wireless switched Ethernet connection. The wireless data communication standards set forth protocols for communications and routing via access point 145, as well as protocols for a variety of other operations. Other operations may include handoff of client devices moving between nodes, self-organizing of routing operations, or self-healing architectures in case of interruption.

Wireless links 115, 125, and 135 may connect to a macro-cellular wireless network 150 via one of the service providers 160 or 170. In the depicted example, service provider A 160 may provide wireless data connectivity via a 3G or 4G protocol. Service provider B 170 may offer connectivity via a 2.5G, 3G or 4G protocol. Any combination of macro-cellular wireless connectivity is possible for each or both of the service providers. The connection quality of service (QOS) and speed of wireless links 115, 125, and 135 may vary widely depending on several factors including the service provider bandwidth, the number of mobile information handling systems and users in a location, and other factors. Quality of service impacts energy consumption and efficiency of a mobile information handling system communicating wirelessly. Thus, selection of a wireless link may depend on assessment of the link radio frequency conditions. Radio frequency conditions for wireless links will evolve over time. Differences in wireless link QOS or efficiency will also vary minute-by-minute, hourly, daily, weekly or monthly or during even longer periods. Thus, assessment may need to be regular.

Wireless link conditions will vary depending on the type of service likely to be requested by the mobile information handling system. For example, voice communication may be most efficient on a 2G wireless protocol. Voice communication on 4G may be more costly in terms of time required for authentication and connectivity negotiation or in terms of transmission power requirements. Data services relating to messaging and SMTP email may have the lowest power cost on 2.5G protocols due to the simplest access barriers there. Higher level data services requiring greater wireless bandwidth may more efficiently use recently implemented protocols. For example, audio streaming may be optimal for 3G protocols. Video streaming and HTTP web browsing may be best suited to 4G protocols and much less efficient at lower protocols which are not designed to accommodate large data throughput.

As the protocols become more advanced, additional registration and initialization for data becomes costly from a processing and power consumption standpoint. This is balanced against the capabilities of the more advanced protocols to handle data transfers. More complicated communication protocols result in greater processing time and authentication/connection message exchange. More robust processor or controller operation and longer delays for transmitter or receiver circuits consume power. On the other hand, certain protocol advancements are designed to make data transfers quicker and more efficient. Thus for example, the 4G protocol may generally consume more power during operation than 2.5G for voice communications, but less power for high volume data transfers.

For this reason, the mobile information handling system operating context can play an important role in determining wireless link conditions and efficiency from a power consumption standpoint. Information about wireless link connection quality and capacity for a service to be used can be advantageous in optimizing communication channel selection. In most cases, transmission or reception via a macro-cellular network 150 base station at a service provider 160 or 170 will take more power than communication via WLAN such as Wi-Fi. Among macro-cellular systems, energy consumption generally, but not in all circumstances, increases at each advancement of technology protocol from 2G to 4G. Plus, increased traffic levels on an advanced macro-cellular protocol may slow down in comparison to an older technology with less active traffic. Additional future macro-cellular protocols are contemplated as well. Those protocols may require additional energy demands of mobile information handling systems.

Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the mobile information handling system used. Certain protocols may not be available on some mobile information handling systems. In each instance, radio frequency transmission subsystems and controllers operate and consume device power. Based on these numerous factors, the system of the present embodiment may automatically switch between radio network technologies or service providers to optimize radio frequency conditions, traffic conditions, device power consumption, cost, or any of the above. Selection of a wireless service provider and technology protocol may generally depend on the optimal wireless technology used for a service requested, the radio frequency conditions of a link, traffic conditions for the wireless link, and availability of a link.

Information handling systems 110, 120, and 130 may connect to the network 140 or 150 via an initial default wireless link with one of the service providers 160, 170 or via a WPAN, Wi-Fi, or WiGig connection. The default wireless link allows the mobile information handling systems 110, 120, and 130 to communicate with the network and in particular with a network broker server system 190. The network broker server system 190 and/or mobile information handling systems 110, 120, and 130 leverage information from a Wireless Intelligence Report system database 195 and may control access to a macro-cellular service provider or WLAN. Network broker server system 190 may be operated as a mobile virtual network operator (MVNO), a wireless service provider wholesaler, a mobile network operator (MNO), or similar type of network broker. The network broker server system 190 may have contractual bulk access to network services from a variety of mobile network operators or service providers. With this access to network services from multiple service providers, the network broker server system 190 may enable access or switch access for information handling systems 110, 120, and 130 among the available service providers. For example, network broker 190 may select among service providers 160 and 170 to information handling systems 110, 120, or 130. Information handling systems 110, 120, and 130 may be multiband capable via the wireless adapters therein. Antenna system frequency and radio protocols for a service provider may be adjusted by way of software programming of transmitter/receiver systems of the wireless adapters in mobile information handling systems 110, 120, and 130. Information handling systems 110, 120, and 130 may be multiband capable via these tunable antennas enabling a wireless adapter to target specific bands depending on the selected service provider and wireless protocol.

The network broker server system may also access aggregated Wireless Intelligence Report 195 about the performance of service providers 160 or 170 and the various wireless protocols they have made available. The aggregated Wireless Intelligence Reports 195 may be accumulated or crowd sourced from multiple handsets operating on a given network or networks. This feature will be described further below. In an alternative embodiment, the aggregated Wireless Intelligence Report 195 may be stored on the network broker server system itself. The selection of a service provider and protocol by the network broker server system 190 for an information handling system seeking a wireless link will be according to a recommendation received from a context aware radio resource management system agent running on the information handling system. The wireless link recommendation may be a weighted list of service provider options and protocols. It may be submitted by the context aware radio resource management system operating to the network broker server system 190 in the described embodiment. Alternatively, the context aware radio resource management system agent could run remotely on the network broker server systems or at a remote data center and use a default wireless link until an optimal wireless link is selected and the system is switched.

In an alternative embodiment, the radio frequency subsystems of a wireless adapter may contain individual subscriber identity module (SIM) profiles for each technology service provider and their available protocol. These multiple SIM profiles on the mobile information handling system may be provided by one broker such as an MVNO, or by multiple service providers. The system may have an application processor for the wireless adapter capable of switching between SIM profiles at the information handling system. The switching between SIM profiles and accessing the service providers may be conducted by information handling systems 110, 120, or 130. Thus, a wireless link recommendation from a context aware radio resource management system would not need to be transmitted to network broker server system 190. Information handling systems 110, 120, or 130 may select a SIM profile for a recommended service provider and protocol and seek direct access. Nonetheless, billing and other coordination of SIM profile options may be managed by a broker such as an MVNO. The context aware radio resource management system is described further below.

Figure 2:
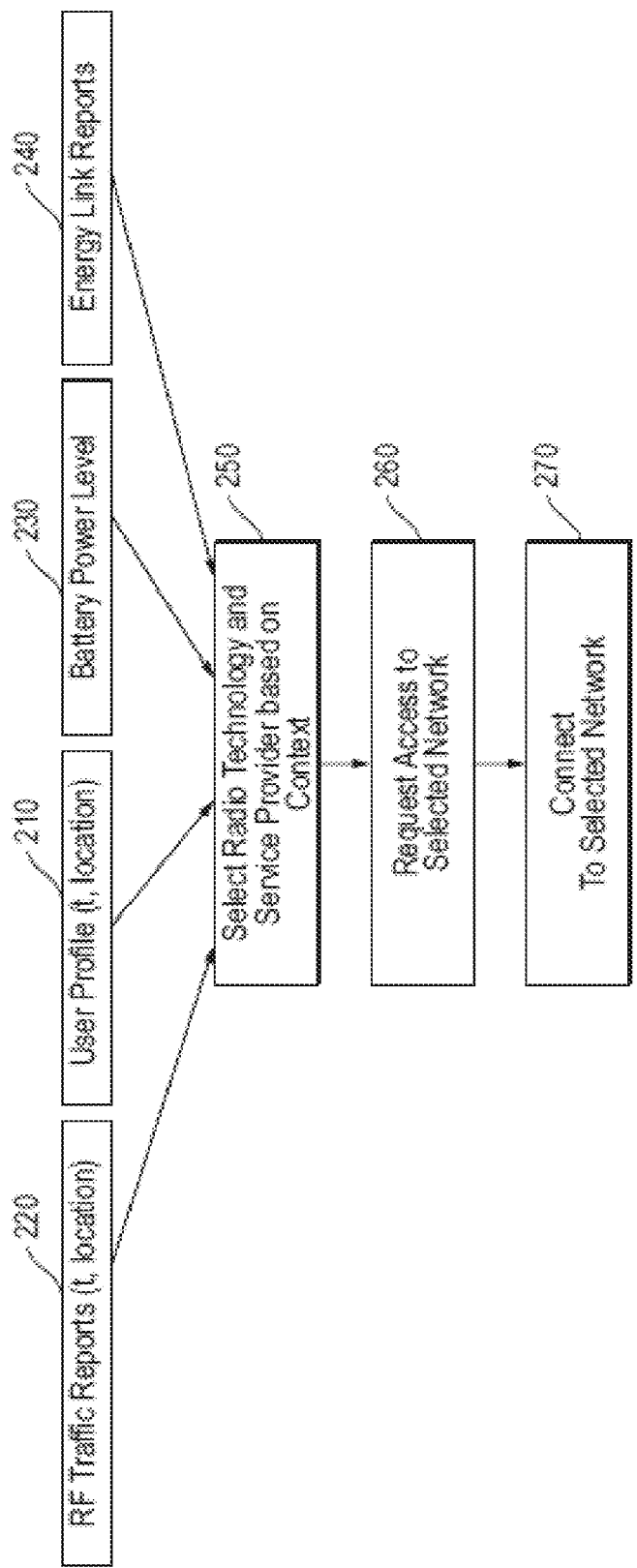
FIG. 2 is a flow diagram illustrating a method of connecting to a wireless network using a context aware radio resource management system according to an embodiment of the present disclosure.

FIG. 2 illustrates a context aware radio resource management method for use in selecting a network and technology within wireless network 100 at a given location. Several factors are assessed by the context aware radio resource management method in selecting a radio technology and a service provider. A software agent is deployed at a mobile information handling system or elsewhere in the network for executing the context aware radio resource management method. At step 210, the context aware radio resource management system software agent obtains user profile data. The user profile data establishes an approximate cyclostationary usage pattern of the mobile information handling system. The time of day, location, types of usage, and usage percentages during a sample time interval are example factors included in the user profile data. This user profile data also may include a confidence of the estimate. This may be a statistical measurement of a mean and standard deviation for a set of data. Alternatively, the confidence of estimate may involve a goodness of fit metric to an expected set of values. Alternative statistical analysis may be performed on the user profile data to provide a confidence of the estimate.

At step 220, the context aware radio resource management system receives wireless link radio frequency broadband traffic reports. For location and time, available radio technologies and service providers are listed. The reports contain data relating to location, time and a radio frequency profile of given radio technologies for the available service providers. The data may also include an associated confidence of estimate. The wireless link radio frequency profile may combine recent reports, historical traffic reports, as well as data measured via an active device radio frequency scan. In order to minimize a mobile information handling system battery power consumed, radio frequency broadband traffic reports from the network may only be requested or sent when a service provider network or a mobile information handling system detects a significant change in signal quality or the network broker server detects that the local crowd source information is out of date.

The context aware radio resource management system receives battery power level data at step 230 from an intelligent battery management system of the mobile information handling system. The battery power level input may determine that certain wireless communication protocols are too costly in terms of power. Below a defined battery level threshold, the context aware radio resource management system may disable the most advanced protocols to save energy. For example, with only 10% battery power remaining, the context aware system may recommend to a user to disable high power consuming protocols such as 4G. The option may be given to the user, or automatic shut down of the radio frequency subsystem may take place. In a further example, the context aware system may recommend or shut down 3.5G at 5% remaining battery power. Any threshold levels may be set to trigger recommended shut down. This data provides the context aware radio resource management system with an ability to manage the mobile information handling system power consumption when battery levels are low. The context aware radio resource management system may switch wireless protocols being when receiving a shut down recommendation. The switching may happen with a continuous connection to the same service provider.

The intelligent battery power management may also determine which services or protocols are unavailable at a given location. This information may come in part from radio frequency profile data in the radio frequency broadband traffic reports. In that case, the radio frequency subsystem transmitters, receivers, and controllers associated with unavailable protocols may be turned off by the context aware radio resource management system. For example, if no 4G WWAN is detected, the radios capable of communicating with these protocols may be turned off in the mobile information handling system. As before, the option may be recommended to the user of the mobile information handling system before shutting a subsystem down.

Step 240 depicts that a variation of the mobile broadband traffic reports may be used by the context aware radio resource management system. The variation is a link energy consumption report. These energy link reports contain data relating to time, location and radio frequency profile information similar to the radio frequency broadband traffic reports 220. In addition, measurements of energy consumed during use of a specified wireless link for a specified wireless service type is reported. The energy link data profile matrix can provide more detailed information above the mobile broadband radio frequency traffic reports. As with other input factors, a confidence of estimate associated with this data may be included. The energy link report data may combine recent energy link profiles, historical energy link reports, and measurements through mobile information handling system scans during operation.

At method step 250, the context aware radio resource management system receives the user profile data 210, the wireless link radio frequency broadband traffic reports 220, and battery power level data 230. Alternatively, the energy link reports 240 may be received as a variation of the wireless link radio frequency broadband traffic reports 220. These inputs are assessed by the context aware radio resource management system software agent at 250. The context aware radio resource management system software agent determines the optimal radio frequency technology protocol and service provider to be used. This determination is based, at least in part, on some subset of data in the input reports. Also, the settings such as what protocols are available, which protocols have been shut down, or what power is required to transmit on a given protocol are determined for the mobile information handling system.

In one embodiment, the wireless link assessment 250 may result in a ranked list of service providers. Using user profile reports 210 and radio frequency link reports 220, each service provider may be given an overall rank as follows:

$$\text{Service Provider Rating}(j) = \Sigma_{i=1 \text{ to } k}(\text{User Profile by Technology} \times \text{Link Rating}),$$

where i=a technology index, j=service provider index, and k=the number of wireless technologies.

The service providers can be ranked by this score. For a matrix of link protocols=[2G, 2.5G, 3G, 3.5G, 4G], an example user profile by technology may result in the following matrix (30%, 25%, 15%, 30%, 0%). The user profile shows the anticipated protocol usage score from a location and time period. A Link Rating (j) may result in the following matrix (70%, 80%, 95%, 90%, 30%). The link rating shows a quality of service score by protocol for a service provider at a location and time. The service provider rating for a user profile in this example would result in 0.8225. Altering the weight of factors may increase or decrease the relevance of certain protocols depending on the change to the calculations. Either the user profile scores or the link ratings may change the calculations of the scores assigned there. This is described further below. The above values serve only as an example.

Battery power levels 230, energy link reports 240, and additional factors, such as subscriber cost of wireless link usage, may also be assessed to select a wireless link. Subscriber cost or settings may influence the determination by weighting protocol options and influence the scoring described below. Alternatively, settings or subscriber cost may be used to mask out protocol options altogether.

The selection of a wireless link by the context aware radio resource management system may depend on the factors and settings described above. For example, if optimal speed of connection is the goal with less consideration of power consumption, the weight assigned by the context aware system to input data may be influenced. This may be the case if the context aware resource management system detects a connection to an AC power source. User profile data 210 showing usage and the wireless link radio frequency broadband traffic reports 220 indicating link quality and capacity will be more heavily weighted. Energy consumption data may be less heavily weighed. If on the other hand, lower power consumption and long battery life are optimal considerations, battery power level data 230 and the energy link reports 240 may be more heavily weighted. Any combination of weighting involving anticipated usage, radio frequency channel quality, battery power levels, or efficient power consumption may be used in the present embodiment.

Upon determination of an optimal link or links, the context aware radio resource management system provides a command to select a preferred wireless link protocol and service provider. In an alternative embodiment, a list is created providing a preferred set of wireless links and protocols. The context aware radio resource management system may also list wireless links in rank order as described above.

At method step 260, a request is made for access to the selected network. The context aware radio resource management system transmits a command or a list of selected wireless link providers and protocols to a network broker server. The mobile information handling system contacts the network broker server via a default wireless link made available to it. With the weighted list, the network broker server may negotiate access to preferred service providers and protocols for the location of the mobile information handling system. Alternatively, the context aware radio resource management system provides a list or command to an application processor controlling SIM profile selection within the mobile information handling system. Then the wireless adapter negotiates access to a preferred service provider and selects a protocol.

At step 270, if the access request is accepted by the service provider, the mobile information handling system is connected to the selected service provider and wireless protocol. If access is declined, the network broker server or wireless adapter will request access to another preferred protocol and service provider in the weighted list received from the context aware radio resource management system. If the list is in rank order, then one embodiment may turn to the next ranked protocol and service provider. This repeats until a satisfactory wireless link is found and access made for the mobile information handling system.

Figure 3:
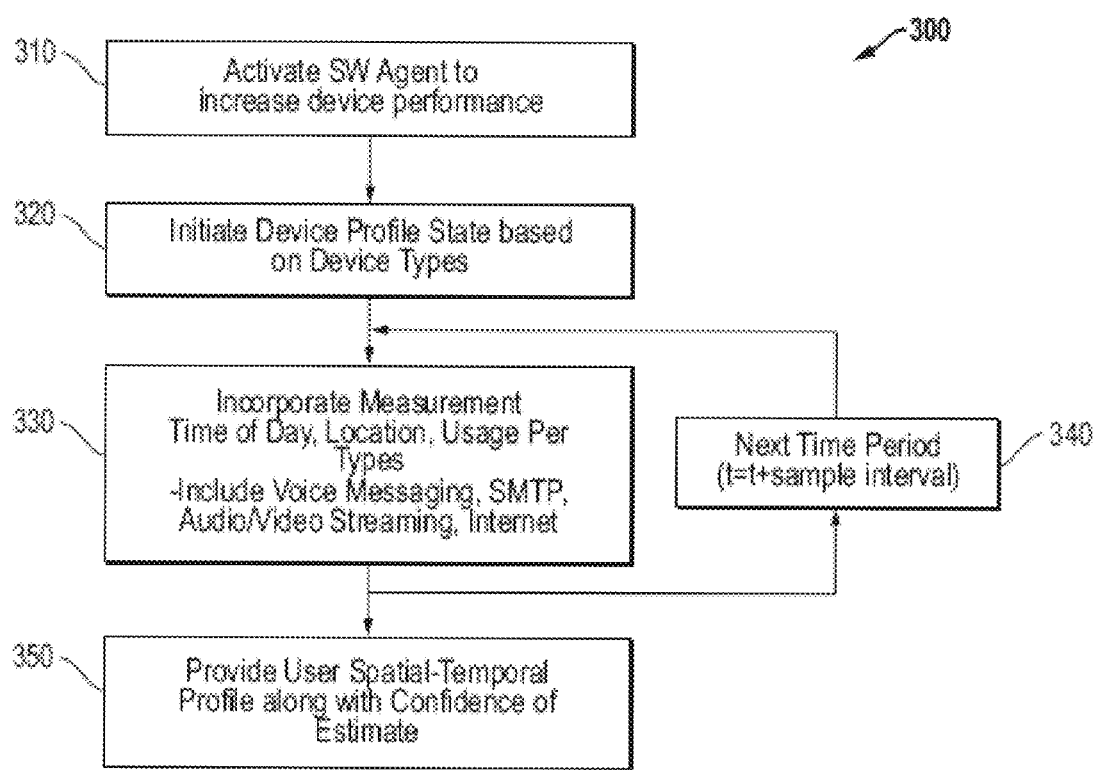
FIG. 3 is a flow diagram illustrating a method of mobile information handling system usage profiling according to an embodiment of the present disclosure.

FIG. 3 illustrates a method 300 for generating an end-user profile in the context aware radio resource management system. In the first step 310, the context aware radio resource management system software agent is started to optimize device performance in selecting a wireless link. At step 320, the context aware radio resource management system software agent initiates a baseline device profile state. The device profile state reflects expected usage for the mobile information handling system. It includes various usage service types. Example usage types may include voice, audio streaming, video streaming, internet usage, email communication, SMS or other messaging. A previous user data profile collected for the operation of the mobile information handling system may serve as the baseline device profile. Such a profile is specific to the location of the device and to a time slice during which operation is being optimized. Locations may be assigned to geographic zones such as a campus, city, borough, county, etc. Time may be assigned to defined time periods during a day but may differ across days of the week. This zoning and time definition is optional but will help control the number of different user profiles generated.

In one embodiment, a set default user profile may be used as a baseline. For example, the client service profile may assume SMS messaging consumes 10% of device usage, voice communications consume 30%, video streaming consumes 10% of usage, audio streaming consumes 15% of usage, SMTP email consumes 10%, and internet activity consumes 25%. This baseline state may be specific to the mobile information handling system type. For example, the mobile information handling system may be geared toward usage on a certain network protocol. For example, certain systems may be optimized to operate on a 3G or 4G network. Additionally, a default service provider and wireless protocol may generally be assigned to the mobile information handling system. This default wireless link may affect or set the baseline profile state.

At step 330, the context aware radio resource management system may initiate operational measurements according to time of day, location of mobile information handling system, and usage levels for various usage types. The usage data measurements may be taken during sample intervals. For example, during a time period from a specific location zone, the context aware radio resource management system may monitor operation of the mobile information handling system. It will measure the dwell time or use percentage of each type of service. This can include measuring minutes used or number of calls made for voice service. It can measure bytes transferred or number of requests made for video streaming or audio streaming. It may measure the number of messages sent and received or bytes transferred for SMTP, SMS, or similar messaging. The context aware radio resource management system can also measure the data requests and responses or data volumes exchanged in internet accesses. At each sample interval, the available service providers and available wireless link protocols may be determined as well.

The results of the measurements are incorporated into a user profile at step 330. Rather than strictly relying of total data volumes or number of requests, the measurements may be scaled or normalized to reflect a percentage of service usage. This normalized scoring permits comparison. The normalization may be scaled to permit scores of usage reflecting importance or frequency of access to the service types. For example, while audio/video streaming may take a large amount of data, usage may be uncommon. For the same time period, the voice service usage or SMTP messaging may be substantially more frequent but may not transfer as much data volume. Therefore, service recommendations may be better scaled toward frequency of accesses rather than total data throughput volumes. If on the other hand video streaming is a daily occurrence, even if only one request occurs at that time period, then scaling may lean toward total data volume. In this case, normalization scaling in favor of data throughput volume may more accurately reflect the usage.

The use or usage percentage may be measured and scored according to the preferred parameters set in the context aware radio resource management system. It may also be averaged with the baseline default or historical user profile state if so desired. For example, previously measured usage data for a location zone and time period may provide higher data confidence if averaged into measured data.

Measurements may be repeatedly taken in later sample intervals at step 340. Such measurements may be conducted throughout an entire day and over the course of several days or longer. The multiple sample measurements of the mobile information handling system usage comprise a spatial-temporal user profile. The spatial-temporal user profile may have an associated confidence estimate. At step 350, the spatial-temporal user profile and any confidence estimate will be stored either at the mobile information handling system or elsewhere in an available database. The spatial-temporal user profile for the mobile information handling system usage assists in selection of radio frequency links for given times and location zones. The user profile may predict the predominantly used combination of services typical of the mobile information handling system during a time period or from a certain location. The predicted service usage assists in selecting an optimal service provider and radio frequency protocol. The spatial-temporal user profile information will be stored in the mobile information handling system to protect end-user privacy information To apply this data to selection of a wireless service provider and protocol, the usage percentage levels are mapped to service protocols available to a mobile information handling system. The mapping of use percentages to a protocol may involve assigning the use percentage for a service to the lowest power consuming protocol available for a usage type. In other words, the service type usage score is mapped to the technology protocol most efficient for that service type. For example, voice communication usage may be assigned to a 2G protocol whereas audio or video streaming may be assigned to 4G. These energy efficiency rules are stored as part of system parameters. These parameters are used to map services to optimal wireless technology. The parameters may also be adjusted as a function of energy state or battery power levels of the mobile information handling system. The parameters may also be specific to the make or model of the mobile information handling system and its capabilities in processing, memory, radio frequency transmission systems and other features.

Once the usage levels are measured and scaled according to anticipated importance of data throughput versus frequency of access, the result may score messaging at 20% of usage, voice at 30% of usage, video at 10% of usage, audio at 15% of usage, SMTP at 5% of usage, and internet at 20% of usage. For optimizing minimal power consumption, each service usage is mapped to a service protocol. For example, voice may consume the least power on a 2G network. If 2G cannot accommodate video streaming, it may be eliminated however. The voice score is associated with the most efficient choice available. If video streaming is very infrequent at less than 5%, then elimination of 2G protocol may be disregarded. Should the rare video streaming service request occur, the cost of switching protocols may be worthwhile at that time. Switching protocols may even occur within one service provider to minimize cost of access, negotiation, authentication, and switching with a different service provider.

In the present example, messaging and SMTP email are optimal at 2.5G. The email usage score is then mapped to 2.5G, 3G may consume more power, but also may be determined to provide audio streaming services most efficiently. Thus, the audio streaming usage score is mapped to 3G. Internet access and video streaming may be most efficient in a 4G protocol and thus mapped to this protocol. If 4G is unavailable, then 3.5G may be selected instead if it is the next most efficient protocol level.

The mapping will result in a service profile of protocol technology assigned according to optimal power consumption efficiency for the services anticipated for a mobile information handling system. For example, 2G may be weighted with a value of 30% as optimal for voice usage. 2.5 G may be weighted at 25% as optimal for SMS messaging and SMTP email messaging. 3G may be weighted at 15% as optimal for audio streaming usage. And 3.5G may be weighted at 30% for video streaming and http internet access in the case that 4G is unavailable. For a matrix of link protocols=[2G, 2.5G, 3G, 3.5G, 4G], a user profile by technology may result in the following example matrix (30%, 25%, 15%, 30%, 0%). This spatial-temporal user profile data is then utilized by the context aware radio resource management system alone or in combination with other profile reports shown in FIG. 2 to select a wireless link.

Figure 4:
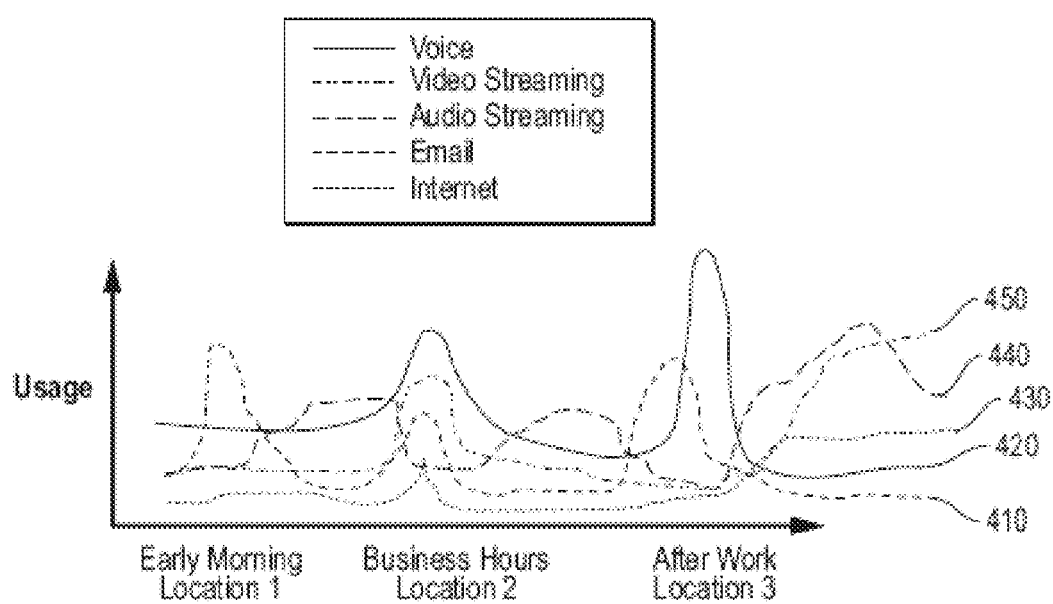
FIG. 4 is a chart illustrating an example usage profile of a mobile information handling system according to an embodiment of the present disclosure.

FIG. 4 illustrates a graphical example of spatial-temporal user trends for a mobile information handling system. As shown in FIG. 4, user trend behavior measurements are shown as a function of time and location. Five usage types are illustrated in this example, voice, video streaming, audio streaming, email, and internet usage. Usage amounts are shown along the x-axis. The y-axis depicts time and various locations. In this example, three locations and time periods are defined, though more or fewer could exist. Those time periods are early morning usage at Location 1, business hours usage at Location 2, and after work hours at Location 3. Each general time period may be comprised of multiple time slices with separate data samples. The mobile information handling system may apply a curve fitting approach to the user profile data to compress information associated with a level of use per type of service per unit of time. An n-order polynomial approach may be used to reduce information to N parameters.

Email usage is depicted in trace 410. Voice bandwidth usage is depicted in trace 420. Internet usage is depicted in trace 430. Audio streaming usage is depicted in trace 440. And video streaming usage is depicted in trace 450. In many cases, the user profile data can be expected to be cyclostationary. In other words, the usage trends repeat themselves. For example, usage may repeat itself daily during a business week. In the example of FIG. 4, voice bandwidth usage 420 increases mid-day during business hours at location 2 during lunch. Voice bandwidth consumption 420 will again increase during after work hours at location 3. This may include increasing during a commute home or upon returning home. Similarly, trends in email usage 410 may show peaks at all three locations with lower bandwidth usage trends arising during non-break business hours at location 2 and late in the evening after work at location 3. Thus, despite variability in these usage schedules, some cyclostationary consistency can be established. For this reason, time period data may be averaged for weekdays or may be specific to Wednesdays depending on the trends. Variability may be accounted for with confidence estimates on the data.

Figure 5:
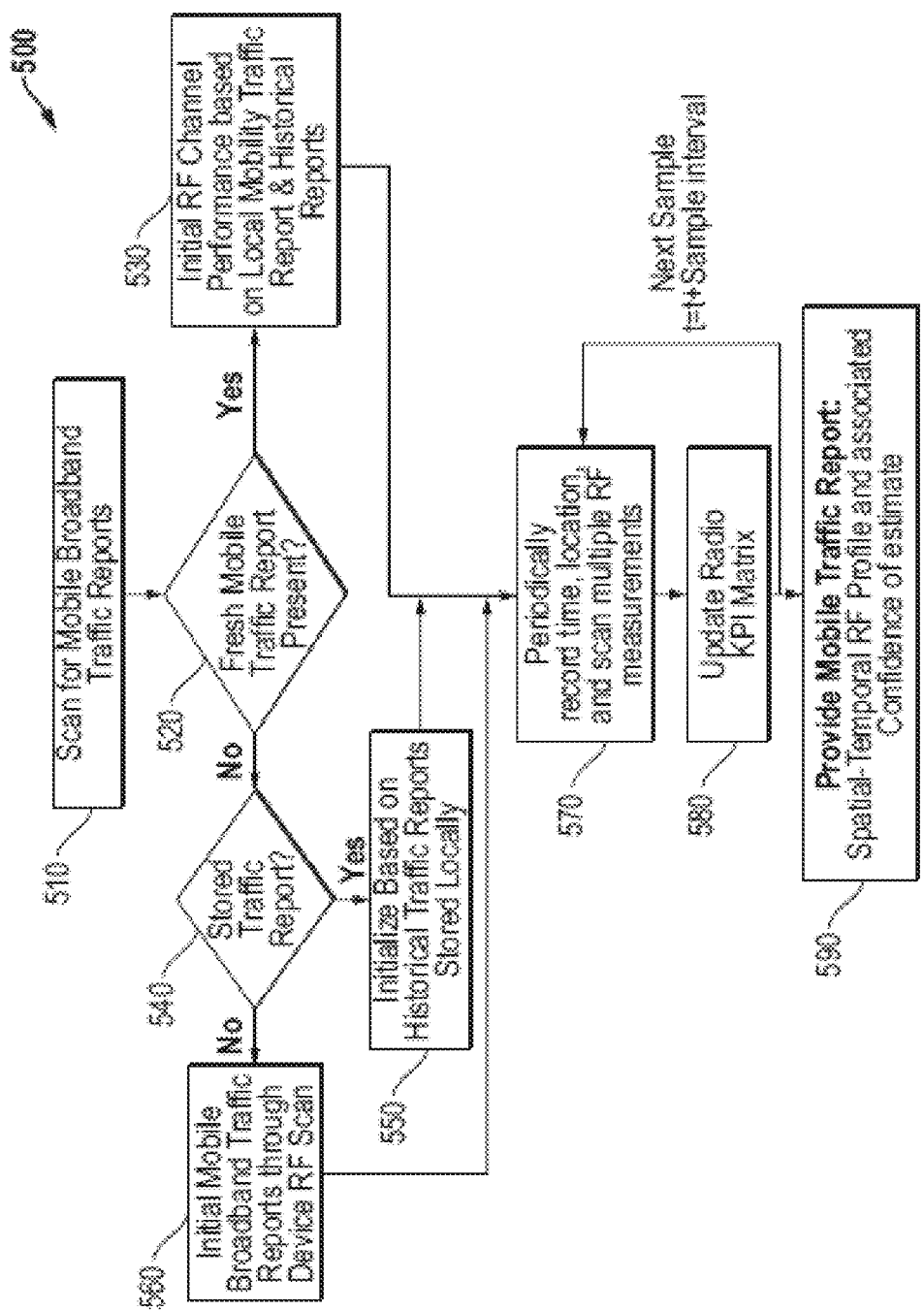
FIG. 5 is a flow diagram illustrating a method for wireless link traffic reporting according to an embodiment of the present disclosure.

FIG. 5 shows a method 500 for establishing a mobile broadband traffic report for a wireless link for wireless links. The mobile broadband traffic report partially comprises a spatial-temporal radio frequency profile for the wireless links. The systems begins with a baseline mobile broadband report available from a network broker system or available from cooperative service providers if no previously measured data is available. By way of example, baseline data may be drawn from available wireless coverage maps.

Key performance indicators (KPI) comprise a spatial-temporal radio frequency profile. Data such as received signal strength (RSSI), signal-to-noise ratios (SNR), or signal to interference ratios (SIR) may be relevant channel quality indicators in a KPI matrix. Other data, may include data throughput speeds and communication latencies. One or more of these performance indicators may be used to compute a link rating for a wireless link. Baseline reports rely on estimated values. For example using baseline estimated received signal strength indicators (RSSI), a link rating may be computed as follows:

Link Rating$(i,j)$=MAX(MIN(100%,(Estimated RSSI Signal Carrier−Minimum Signal)/Max RSSI signal−Minimum RSSI signal,0%), where i is a technology index and j is a service provider index.

A maximum RSSI level may be defined in a technology protocol, for example as −70 dBm. The minimum RSSI level may be defined as well, for example at −110 dBm. RSSI is not the only key performance indicator that may be used to compute link ratings. Link rating may be based on different key performance indicator values besides received signal strength. Alternatively, multiple key performance indicator values may be used in the computation of a link rating.

A link rating matrix is established by link protocols for a service provider. For a matrix of [2G, 2.5G, 3G, 3.5G, 4G], the baseline Link Rating (j) computation may result in (70%, 80%, 95%, 90%, 30%). 100% indicates best signal link quality and 0% indicates a signal quality below a minimum acceptable level. The Link Rating (j) evaluates a service provider overall. The context aware radio resource management system may use the link rating scores to evaluate the optimal wireless service providers and available protocols for the anticipated usages. Once a service provider is selected, the context aware radio resource management system may switch between protocols within one service provider depending on changes in usage. Thus, the link rating protocol matrix can assist in selecting a service provider with the best scores in multiple protocols.

At block 510, a context aware radio resource management system operating on a mobile information handling system may scan for wireless link mobile broadband traffic reports fitting a time and location zone for operation. Wireless link mobile broadband traffic reports may be retrieved from a central server database in the wireless networks 140 and 150. Alternatively they may be located elsewhere in a database such as at a network broker server system. The baseline report may be supplemented or superseded by any fresh or historical mobile traffic reports to assist in selecting a service provider and protocol. Recent or historic radio frequency profiles for time period and location zone may be used to update or supplement the wireless link mobile broadband traffic reports. More recent data may be of greater relevance however. For example, the link ratings in a radio frequency profile may utilize recently measured RSSI values instead of estimated values.

Mobile broadband traffic reports are aggregated via crowd sourcing. They may be categorized by location zone and have time and date stamps to identify freshness. Crowd sourcing of information will enhance the availability of accurate data for location zones and times of mobile information handling system operation. For example, if a mobile information handling system makes a request for a fresh mobile broadband traffic report, the central server database may have reports from other mobile information handling systems with recent timestamps. Alternatively, the central server database may make a request for a recent mobile broadband traffic report from mobile information handling systems in the same location. Whether via recent storage in the central database or via a recent request of fresh crowd sourced mobile broadband traffic reports, such a report may avoid the need for the mobile information handling system to conduct a radio frequency scan itself.

Crowd sourcing mobile broadband traffic reports for locations and times provides a higher chance that a current mobile broadband traffic report for a location is available. It also increases the available data points providing greater certainty and reliability of data. Part of the benefit of crowd sourcing may also involve performing a hysteresis analysis on the data coming from multiple mobile information handling systems to determine trends in wireless link selection. When a wireless link is reported having low traffic and good radio frequency conditions, traffic from systems using the context aware radio resource management system will elect that wireless link. If a large part of the crowd of mobile information handling systems begin to pile onto whichever wireless link is reported to have the best available bandwidth, that link will slow down and underperform. The mobile broadband traffic reports account for this by conducting a hysteresis analysis. If a large number of users begin to select this wireless link, then the method for generating mobile broadband traffic reports accounts for this traffic and alters the recommended wireless links. For example, a second best option may be recommended as optimal for traffic and radio frequency conditions instead. Each crowd sourced mobile broadband traffic report identifies its selected link. A count of these selections can be compared to a threshold rate level of selections for a given link. If the rate of selections exceeds the threshold for a link, then the recommendation may be altered.

At block 520, the method determines whether a fresh mobile broadband traffic report is available for the location of the mobile information handling system. If so, a fresh mobile broadband traffic report is retrieved from a central server database. At 530, the method assesses the fresh mobile broadband traffic reports and any available historical mobile broadband traffic reports. Historical mobile broadband traffic reports may be stored locally for the mobile information handling system or received from a central server database. Assessment of both fresh and historical data is used to determine one or more optimal wireless links at step 530. The combination of fresh and historical information provides a radio frequency channel performance assessment of the wireless links. While fresh report data may be weighted more, historical data may add additional depth of data. The context aware radio resource management system elects a wireless link based, at least in part, on the radio frequency channel performance profile as described in FIG. 2.

If no fresh mobile broadband traffic reports are available at step 520, the method seeks stored historical mobile broadband traffic reports from the central server database at step 540. Depending upon the age of these historical mobile broadband traffic reports and the estimated confidence associated with that data, the method will establish a radio frequency channel performance profile based on historical mobile broadband traffic reports at step 550. If there are no reliable historical mobile broadband traffic reports recent enough to base an assessment upon, the context aware radio resource management system initiates a mobile information handling system radio frequency scan. This scan collects data regarding possible wireless links at step 560. This radio frequency scan consumes power and processor resources so should be used sparingly, however it provides up-to-date key performance indicators (KPI) for a new radio frequency profile to be used in a mobile broadband traffic report. Based upon this new mobile broadband traffic report, the system provides a wireless link performance profile to be used by the context aware radio resource management system.

The scan or test of radio frequency links may be conducted by the context aware radio resource management system. As a first measure, received signal strength and bandwidth availability for a service provider and a protocol are determined. Then a test of radio frequency data capacity is made. This can test upload and download performance for each service provider and protocol. For example, a standard test data volume may be sent via a wireless link to a server location at the service provider. Similarly, a test data volume may be received from a server location by the mobile information handling system via the wireless link. Latency of response, upload and download speed or throughput can then be measured for the service provider and protocol. The data is associated with a location zone and stamped with a time and date. The type of transmitter/receiver or mobile information handling system may also be recorded. This data set provides a wireless link radio frequency profile that may become part of a mobile broadband traffic report. Upon measuring this data for a location, the report may be shared or published by the context aware radio resource management system from the mobile information handling system.

Once a radio frequency channel performance profile is submitted to the context aware radio resource management system and a wireless link selected, the mobile information handling system may periodically scan multiple wireless links or measure the selected wireless link at step 570. The system may conduct testing to determine the capacity of a link during operation. In order to minimize radio communication and use of resources, the network broker may be used to proactively notify a mobile information handling system if a wireless link selection was made using an obsolete crowd-sourced data source. This network broker server system may compare time stamps of crowd-sourced data used for wireless link selection or ranking with current time stamps of network-stored crowd-sourced material.

Testing is similar to the testing described above. Additionally, context aware radio resource management system may assess the quality of the wireless link being used. In addition to the capacity above, metrics such as bit error rate (BER) and signal-to-interference metrics may be assessed. Bit error rate is the ratio of error bits to total bits sent across a wireless link. It is a metric illustrating a signal to noise ratio which can define the quality of a radio connection for a wireless link. A bit error rate may be a comparison of a sent test stream of data by a transmitter with what is received by a receiver. The bit error rate can be tested by a bit error rate tester in software which transmits a known bit pattern to or from the mobile information handling system. Pre-error correction errors are counted. A signal-to-interference ratio may also be measured. Such a measurement is based on the power levels for signal transmission (e.g., per bit) relative to interference levels in the received signal. Packet error rate, signal-to-noise measurement, or other signal quality testing is also contemplated.

At step 580, the periodic wireless link scan updates a wireless key performance indicator (KPI) data matrix stored on the mobile information handling system. The KPI matrix establishes the spatial-temporal radio frequency profile and comprises the data for the mobile broadband traffic report. The updated data is time or date stamped to establish its freshness. The system may repeat the periodic wireless link scans and update the KPI matrix for future intervals of time.

At step 590, the spatial-temporal radio frequency profile of the current mobile broadband traffic report and any associated confidence of estimate may optionally be advertised to the central server database for use by other mobile information handling systems. Thus, the mobile information handling system may provide its contribution to the crowd sourcing data for a time and location of wireless link access. Alternatively, the mobile information handling system may store the mobile broadband traffic report locally and respond to requests from a central server database for the information.

Figure 6:
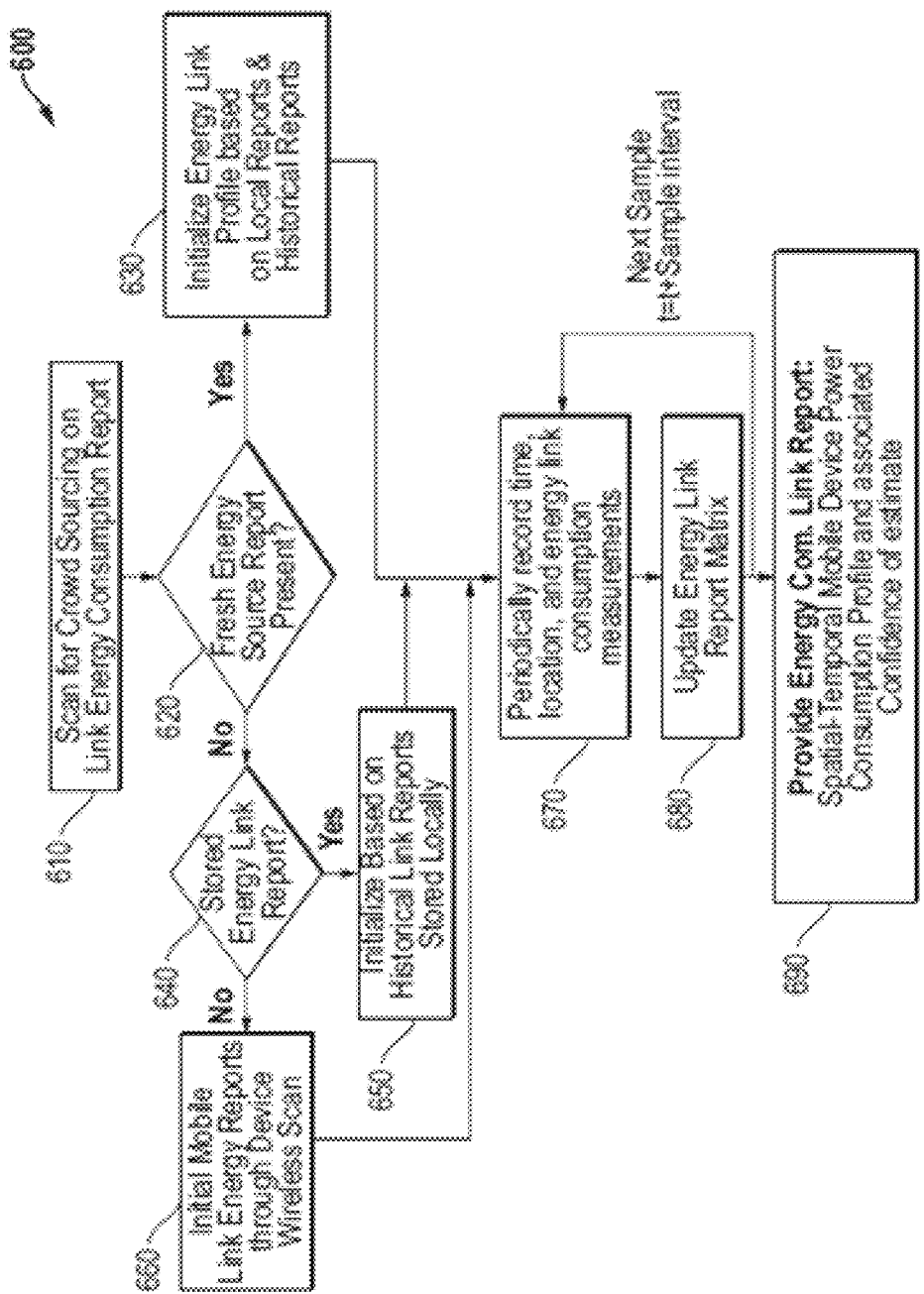
FIG. 6 is a flow diagram illustrating a method for wireless link energy consumption reporting according to an embodiment of the present disclosure.

FIG. 6 shows a method 600 for profiling link energy consumption for wireless communication links. This is an alternative embodiment to the method of FIG. 5 for assessing spatial-temporal radio frequency profiles for wireless links. In addition to assessment of link capacity and quality as in the method of FIG. 5, the system additionally assesses data for device energy consumption relating to various services. In this embodiment, the context aware radio resource management system prepares and delivers an energy link consumption report. The energy link consumption report provides data on power consumed by a mobile information handling system while performing certain tasks on a wireless link at a location. Energy link consumption reports contain data indicating how many joules of energy are consumed during sending SMTP emails, sending SMS messages, conducting voice communications, accessing internet services, streaming audio or video, or other uses of mobile information handling systems. This data amounts to another key performance indicator (KPI) in addition to capacity or link quality data for a wireless link. The context aware radio resource management system can measure and utilize some or all data such as link capacity, link quality, and energy consumption in determining preferred wireless links. Link ratings may be calculated similarly to the above description using link energy consumption data. If energy consumption data is unavailable however, the system will function with the mobile broadband traffic reports described in FIG. 5.

Scans for energy consumption information are described further below. The energy link consumption reports retrieved or compiled for the method of FIG. 6 may also record the specific type of information handling system in one embodiment. With a large number of available reports, for example crowd sourced data, filtering for tailored energy consumption information based on a make and model of a mobile information handling system may better account for model-specific variations in wireless operation. As before, the energy link consumption reports are location specific and time specific. Radio frequency scans and energy consumption measurements may consume resources, thus the method begins by searching for available link energy consumption reports.

In step 610, the context aware radio resource management system of a mobile information handling system may scan for energy link consumption reports for the device and location of operation. The scan searches for fresh, crowd sourced energy link consumption reports among data available from a central server database in the wireless networks 140 and 150 or located elsewhere. As described above, crowd sourcing of energy consumption information will enhance the availability of accurate and current data for locations and times of mobile information handling system operation. A request for a fresh energy link consumption report may be submitted to the central server database or some other database storing such reports. The request may be location specific, time period specific, device specific or any combination of the above. Freshness may be a parameter defined by timestamp data on a report submission. For example, reports submitted for a location on the same day or within the past 24 hours may be qualified as fresh. Any limitation of time on freshness may be used. If a time period during a day is split up on an hourly bases, a fresh report may be one that was submitted within the current or previous hour of the same day. Although a different time period for recent radio frequency traffic in a location may also be used by the present embodiment.

In an alternative embodiment, data and reports may not be stored at a central server database, or only a subset of available data may be stored there. The context aware radio resource management system may make a request for a recent energy link consumption report from similarly situated mobile information handling systems at the same location. This request may come indirectly via a request from the central server. Whether via reports stored in the central database or via a recent request for fresh crowd sourced energy link consumption reports, a scan for pre-existing reports may avoid the need for the mobile information handling system to conduct an energy consumption survey itself.

As with the broadband traffic reports for certain locations, part of the crowd sourcing of energy link consumption report data may also involve performing a hysteresis analysis on the data. Analyzing data from multiple mobile information handling systems may determine trends in wireless link selection happening at a location. If many mobile information handling systems at a location begin to select one preferred wireless link, that link may slow down and underperform. The energy link consumption reports account for this crowding onto a link with the hysteresis analysis. If a large number of users begin to select a given wireless link, then the method for generating energy link consumption reports accounts for this factor. The method may alter which links are recommended or in what order they are recommended.

At block 620, the method may determine that a fresh energy link consumption report is available for the location of the mobile information handling system. It does so by receiving an acknowledgment or a fresh energy link consumption report from a central server database. At 630, the method assesses the fresh energy link consumption reports. The method may also retrieve and include historical energy link consumption reports, if available. Historical energy link consumption reports may be stored locally for the mobile information handling system or received at the mobile information handling system from a central server database. These historical reports may not meet the freshness limitation, but may prove useful. Although historical reports may not be weighted as heavily as a fresh report, the historical reports may still add value or depth to the data available for a given location and time.

Assessment of energy link consumption reports are used to suggest a wireless link at step 630. If conservation of battery power is a preeminent consideration, a link having the least power consumption for wireless services may be recommended. In embodiments where a weighted list of available links is provided, selection by least-power-consumed on average may be used. The context aware radio resource management system may also utilize user profile information to recommend links based on the most likely used wireless service or combination of services at a location or during a time period. The links having the least power consumption for a heavily used service or services by the mobile information handling system will be recommended.

Least-power-consumed may not always equate with recommending a wireless link with the greatest capacity or quality however. Although less energy consumption often tracks the quality of a link, link quality may vastly improve as greater power is used in transmission. For example, higher power consuming transmission may be used by a transmitter to improve signal to noise ratio and, therefore, more power yields a higher quality link. In this case, the higher power transmission may be preferred. In certain embodiments, detection by a mobile information handling system of the battery state may determine the priority used. In that case, the context aware radio resource management system analyzes the energy link report in combination with a battery power level assessment in determining recommended wireless links. In another alternative, the mobile information handling system may detect connection to an AC power source to set the priority relating to energy link consumption versus radio frequency capacity and quality. Thus, the context aware radio resource management system elects a wireless link based at least in part on the mobile information handling system power consumption assessment and other factors as described in FIG. 2.

If no fresh energy link consumption reports are available at step 620, the method seeks stored historical energy link consumption reports from the central server database at step 640. Depending upon the age of these historical energy link consumption reports and the estimated confidence associated with that data, the method will establish a mobile information handling system power consumption assessment on historical energy link consumption reports stored locally or received locally at step 650. A link may be recommend based upon that report. Similar considerations to the above may be taken into account.

If there are no historical energy link consumption reports recent enough to base an assessment upon, the context aware radio resource management system initiates a mobile information handling system energy link power scan to collect data regarding possible wireless links at step 660. Conducting this energy link power scan consumes power and processor resources, however it provides up-to-date information for a new energy link consumption report. Based upon this new energy link consumption report, the system provides a mobile information handling system power consumption assessment to be used to select a wireless link by the context aware radio resource management system.

A scan or test of radio frequency and energy consumption of links may be conducted by the context aware radio resource management system. Some measures are similar to the method of FIG. 5 to generate a radio frequency link profile. As a first measure, signal strength and bandwidth availability for a service provider and an available protocol is determined. Then a test of radio frequency channel capacity is made. This can test upload and download performance for each service provider and protocol. For example, a standard test data volume may be sent via a wireless link to a server location at the service provider. Similarly, a test data volume may be received from a server location by the mobile information handling system via the wireless link. Latency of response, upload and download speed or throughput can then be measured for the service provider and protocol. In addition, the context aware radio resource management system may measure the energy consumed in transmitting or receiving the test data volume. The power consumed may therefore be expressed in Joules or converted into a Joules/bit or Joules/byte value based on the standard test data volume. The data is associated with a location and time and it is time and date-stamped. The type of transmitter/receiver or mobile information handling system may also be recorded. This energy consumption data may be included in a wireless link radio frequency profile and become part of a mobile broadband traffic report. Upon measuring this data for a location, the report may be shared or published by the context aware radio resource management system from the mobile information handling system.

Once a mobile information handling system power consumption assessment is submitted to the context aware radio resource management system and a wireless link selected, the mobile information handling system may conduct an ongoing mobile information handling system power consumption scan for the wireless link or links being used. The context aware radio resource management system periodically measures time, location, radio frequency profile data and energy link consumption data for the selected wireless link or links at step 670. The data may be measured during operation of the mobile information handling system. Radio frequency profile measurements such as signal level, capacity, and signal quality may be measured in accordance to the description above for FIG. 5. Power consumption measurements for the mobile information handling system communications on the wireless link are also measured.

Power consumption measurements may be conducted that are specific to the mobile services used. For example, energy consumption during voice communications may be measured. The amount of power, for example in milliwatts or Joules, may be expressed as a measurement per voice minutes consumed. Power measurements of a radio frequency subsystem from the start of a conversation to the end of a conversation may be measured as described above. The context aware radio resource management system associates this power consumption measurement with the service being utilized. Similarly, for data transferred during internet accesses, power consumption may be measured relative to data volumes uploaded or downloaded. The power would be measured at the active radio frequency subsystem beginning during a download and recording the amount of data or time of a download as well. A power-per-byte or similar measurement may be recorded in an energy link data matrix for that location and time of an internet access. Alternatively, power consumption measurement may be made in terms of number of internet accesses or a combination of accesses and data volumes downloaded or uploaded. Since the power measurements themselves consume power and resources, a sampling of power consumption is more likely. Then estimations of power consumption may be made during operation with a given wireless link for a service type.

In another example, audio or video streaming power consumption may be measured in terms of streaming minutes or data volume. Again, the radio frequency subsystem power consumption may be sampled during the duration of a streaming session and averaged or estimated for the streaming event. The content aware radio resource management system may also measure power consumption levels for SMTP, SMS, or other messaging. This may be done on a per data volume of the messages or based on the number of messages transmitted.

All of these measurements are then recorded and stored in the radio frequency and power consumption profile as energy link matrix data. This information may be referred to as a link energy consumption report or it may simply be part of a radio frequency profile in a mobile traffic report.

At step 680, the data from the periodic mobile information handling system power consumption scan is updated in an energy link data matrix stored on the mobile information handling system. For the given periodic scan interval, the context aware radio resource management system updates the energy link report matrix in the radio frequency profile. The energy link report matrix establishes the spatial-temporal mobile information handling system power consumption profile. The updated data is time or date stamped to establish its freshness. The system may repeat the periodic mobile information handling system power consumption scans and update the energy link data matrix for future intervals of time. Because measurement scans of this type may be costly in terms of resources and energy consumption, the frequency of such measurements may be limited by the context aware radio resource management system on the mobile device. In one embodiment, depth of wireless link data for statistical purposes at a given location and time may be achieved with crowd sourcing efforts.

At step 690, the spatial-temporal power consumption profile of the mobile information handling system and any associated confidence of estimate may optionally be advertised to the central server database for use by other mobile information handling systems. Thus, the mobile information handling system may provide its contribution to the crowd sourcing data for a time and location of a wireless link access. Alternatively, the mobile information handling system may store the mobile broadband traffic report locally. It may optionally respond to requests from a central server database with the radio frequency and wireless link power consumption profile information or reports.

Figure 7:
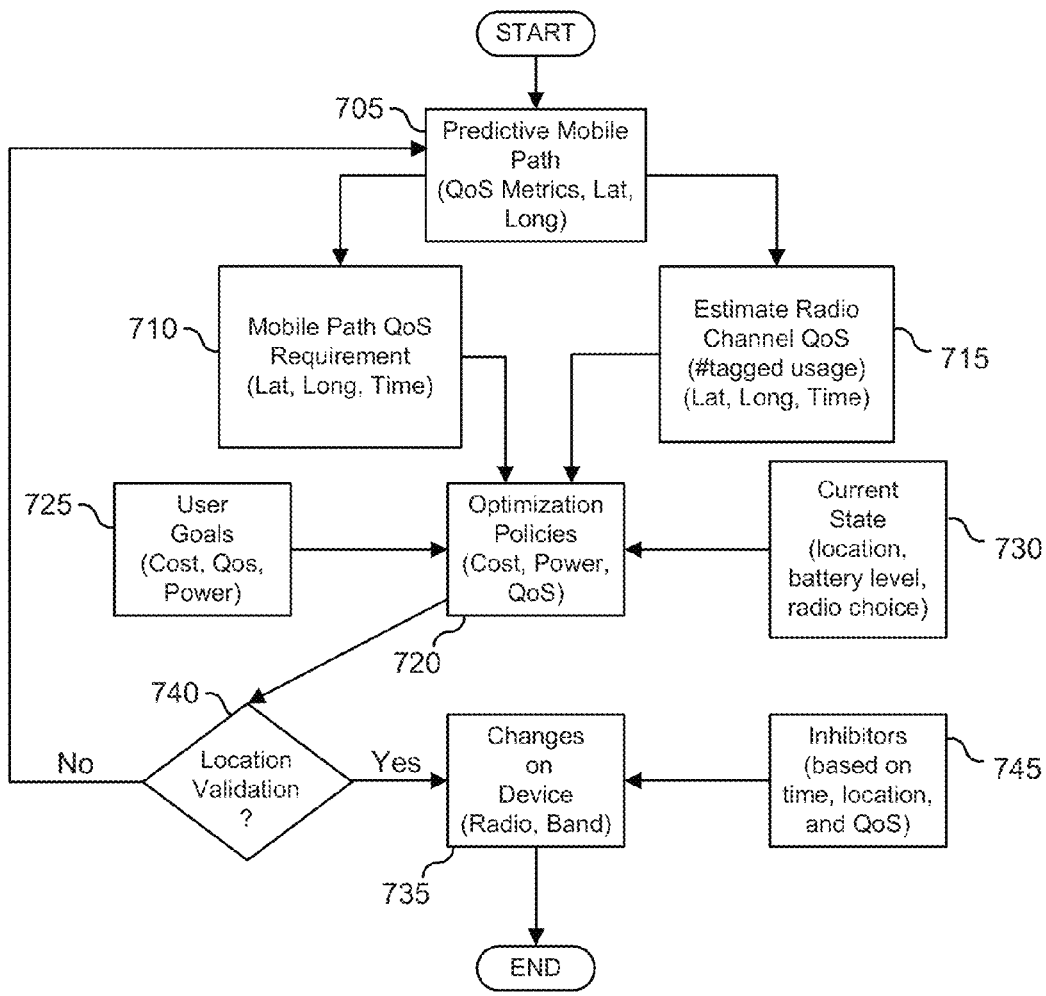
FIG. 7 is a flow diagram illustrating a method of establishing optimized wireless link selection for a mobile device along a predicted path.

FIG. 7 shows an embodiment example method for determining an optimized wireless link selection for a mobile device during future movement. Multiple estimations and data inputs may be analyzed by the context aware radio resource management system. The context aware radio resource management system determines an optimal wireless link selection for the mobile device in terms of cost, power consumption, or quality of wireless channel links for connecting voice or data. FIG. 7 illustrates input data generated via a path prediction system 705, a usage trend determination system to determine predicted path radio usage requirements 710 from user profiles, and a radio link QoS assessment system to determine estimated QoS scoring for radio channels 715 at future locations along the predicted path. Additional inputs may also influence the context aware radio resource management system determination of optimized wireless link selection. Data inputs may include goals or priorities 725 indicating desired priorities of cost, radio link profiles (such as QoS), or power usage from energy link consumption profiles. Additional data analyzed may include current operating states of the mobile device 730. Limitations may also be placed on the context aware radio resource management system to prevent the benefits of the optimized wireless link selection system from intruding too much on user experience. For example, switching too much may impact the efficiency benefits of the method. An example embodiment includes inhibitors 745 that limit changes to wireless links to prevent switching.

The flow begins at 705. The context aware radio resource management system utilizes a path prediction system 705 to determine a predicted future path of travel for the mobile device during a set of future time intervals. The mobile path prediction system uses position data for the mobile information handling system. Velocity and acceleration data are detected by motion sensors on the mobile device or determined from position data. Position data may be determined via a global positioning system. Alternatively, a mobile positioning system via the wireless network may determine position and movement of the mobile device. Using this position data, the mobile path prediction system estimates a predicted future path of travel for the mobile device in a user area.

With the predicted future path, the flow proceeds at 710 to predict path radio usage requirements for the mobile device based on context and history of usage. At 710, the context aware radio resource management system applies usage trends for a matrix of locations to the predicted future path. The usage trend determination system defines a predominant service profile of expected usage types for locations on the predicted path according to historical trends of usage as recorded in user profile data at those locations. The flow also proceeds to 715 where a radio link QoS assessment system utilizes a user service matrix of spatial-temporal radio frequency profiles for locations to determine estimated QoS scoring for radio channels 715. By applying the predicted future path from 705, the radio link QoS assessment system predicts radio link quality over the predicted user path for a variety of radio connections that may be suitable for the mobile device. Wireless intelligence reports are used to create radio link profiles for locations. Radio link profiles may include data relating to mobile broadband traffic and service provider link ratings. Radio link profiles of wireless radio links may also include QoS parameters of data latency, jitter of signal, packet loss statistics, and bandwidth. Minimum QoS requirements of the mobile device will be partially determined by the expected usage at the locations along the predicted path.

The flow proceeds to 720. At 720, the system applies optimization policies for radio link selection. Optimization policies may blend considerations such as cost of radio link usage, power consumption of the mobile system to use the radio link, or quality of service considerations. The optimization policies are applied to the determined predominant service profile of expected usage types and radio link quality over the predicted future path locations. Additional inputs into the optimized radio link selection at 720 may include factors set by the user at 725. Factors set by the user may relate to cost, power usage, and QoS selections.

Sensors may provide additional automatic inputs into the optimized radio link selection at 720 as well. Sensors may detect mobile device current state information at 730 which may include battery levels, the current radio wireless link operating on the mobile device, and consideration of the most current mobile device location. Such incumbent current state information will be considered to determine if making a change to different radio wireless connection is worthwhile. Additionally, the incumbent current state will be weighed with the risk of service interruption or other factors such as whether the improvement is worth the change. For example, if the currently active radio link is determined to be one of the top few optimal radio links on the predicted path, the context aware radio management system will elect not to switch radio links even if the current link is not the most optimal from a cost, QoS, or power perspective. Alternatively, if the weighted QoS parameters of the currently operating link are meet the minimum requirements or are within a threshold level of deviation from the most optimal radio link, then no switch of radio link will occur.

After application of the optimization policies at 720, the flow proceeds to decision diamond 733 for the application of a location validation filter 733. The location validation filter determines whether the predicted future path for the mobile information system is still accurate based on the most recent location measurement. If a sudden change in location and trajectory are detected that deviate from the predicted future path at this stage in the method, the location validation filter rejects the predicted path. Upon rejection, the flow returns to 705 to repeat the process of predicting a future path for the mobile device. If the location validation filter detects a recent location measurement still in or near the predicted future path, this validates the predicted future path and the flow proceeds to 735.

At 735 the method applies the changes to radio wireless link or radio band on the mobile device. Inputs are received at 735 that may override the radio link change command. For example, override commands set by a user or data service provider (not shown) may restrict application of a change to the wireless link used by the mobile device. Inhibitors 745 may also alter implementation of the command to switch wireless links. Inhibitors 745 are based on several factors including time of progression through the predicted future path, locations, and QoS considerations. These inhibitors 745 are used to inhibit highly frequent wireless link changes that could actually cost the mobile device system rather than improve performance. Additional inhibitors 745 include restrictions based on location, such as if the mobile device is in an airplane or at a work location where limitations may be placed on wireless link options. For example, an airplane may be restricted to a WI-FI access. An office location may have restrictions for organization-issued mobile devices limiting wireless link access to WLAN access for cost or security reasons while the mobile device is on the organization's premises. If an override command or the inhibitors 745 do not override the changes, then the context aware radio resource management system executes commands to make the wireless radio link change.

In an alternative embodiment, the method of FIG. 7 may issue optimization policies at 720 and transmit a recommendation to a user rather than execute instructions to automatically change the wireless link. In this way, the user may be presented with an option to elect to change to an optimized wireless link. The user may change wireless links manually, or may elect to have the change made automatically by selecting an option to switch whereby the flow would proceed to execute the change of wireless link as described above. In another alternative embodiment, the user may be presented with a limited number of optimized wireless link options at 720 and may select from among the optimal wireless links for automatic execution of switching during a predicted future path.

Figure 8:
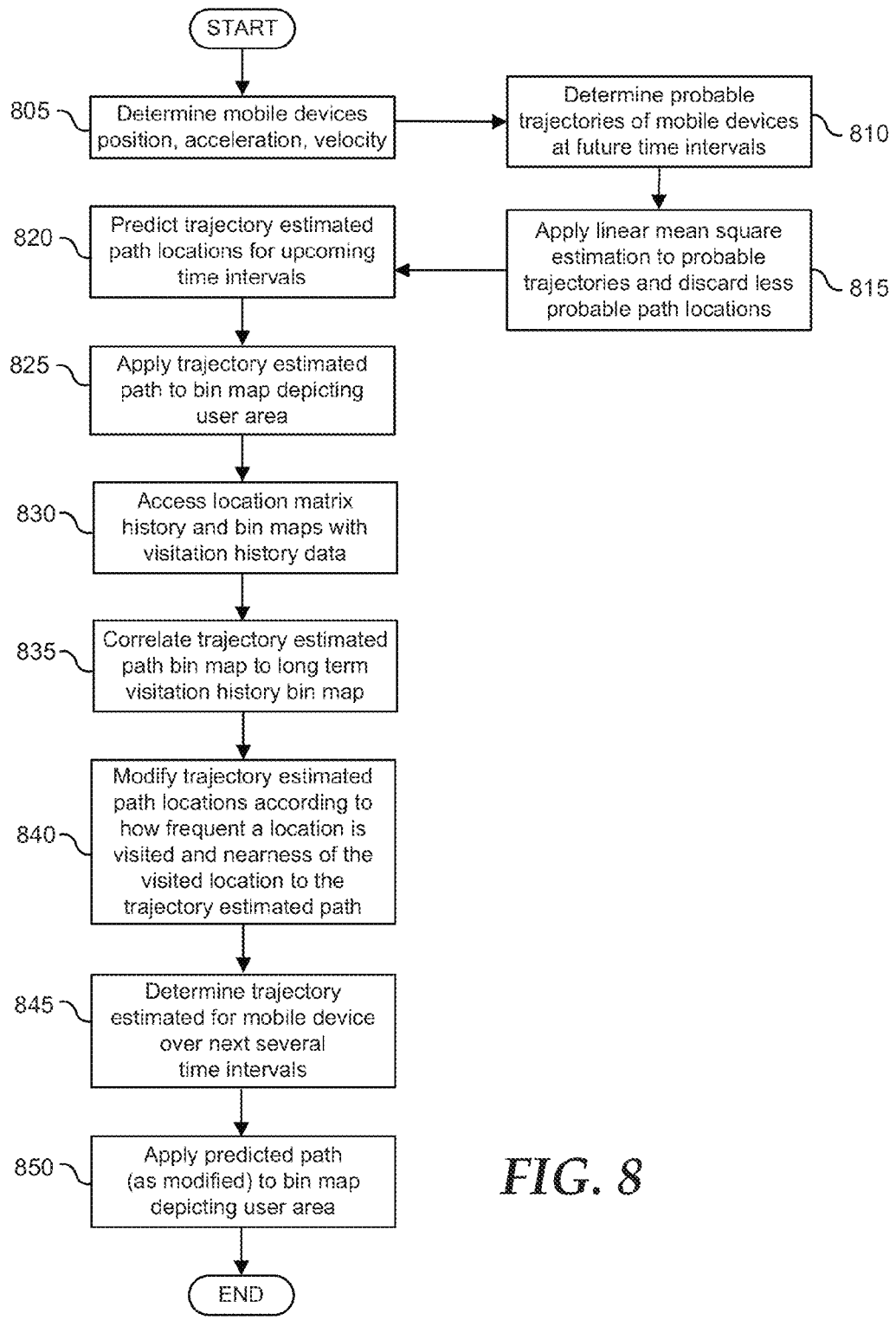
FIG. 8 is a flow diagram illustrating an example method for predicting future mobile device path locations.

FIG. 8 shows method for predicting future mobile device path locations such as with a mobile path prediction system as part of the context aware radio resource management system. The method begins at 805 where the mobile path prediction system determines the position of a mobile device. The mobile path prediction system may operate via execution of instructions via a processor on the mobile information handling system or via a processor on one or more information handling systems in communication with the mobile information handling system via a network connection. For example, the latter may be a cloud based context aware radio resource management system. The mobile information handling system position is detected. To determine velocity, acceleration and direction, an extrapolation of multiple measured position data points may be used. For example, multiple position data points may be taken to determine direction, velocity and acceleration such as via a global positioning system. Alternatively, a mobile positioning system using radio signals strength and location measurements with respect to one or more cell tower locations via a wireless network may determine mobile device position as is known in the art. In an alternative embodiment, the mobile device may have motion sensors integrated to determine direction, velocity, and acceleration. With the motion sensors, at least one position data point is needed. Example motion sensors include geomagnetic reference sensors and any combination of accelerometers and gyroscopic sensors. The position data and any detected velocity and acceleration data is reported to the context aware radio resource management system.

The flow proceeds to 810 where the mobile path prediction system projects multiple probable trajectories for the mobile device(s) at future time intervals. This is done via extrapolating position, direction, velocity and acceleration to a plurality of future time intervals. The locations at the plurality of time intervals establish trajectory paths. Multiple trajectories are determined so that for each future time interval there is a plurality of possible future locations. Proceeding to 815, the mobile path prediction system of the context aware radio resource management system applies probability statistics to the multitude of future path locations. In the present embodiment, a linear mean square estimation is applied to the determined trajectory locations and less probable path locations are discarded. In an example embodiment, the path prediction system applies a Kalman filter probability estimation to the probable trajectory locations to filter out lowest probability path locations.

The flow proceeds to 820, where the mobile path prediction system determines a predicted preliminary path for several locations corresponding to upcoming intervals of time. This preliminary predicted path is then mapped to a bin map depicting a user area at 825. In an example embodiment, the bin map includes a grid of latitude and longitude coordinates for future mobile device path locations. Such an example is illustrated further below with respect to FIG. 9A.

Proceeding to 830, the context aware radio resource management system accesses a location matrix having historic visitation data for the mobile information handling system. The history of visitation is recorded from user profile data for mobile devices as described above. The visitation history location matrix may be also mapped to a bin map of user area. The visitation history location matrix contains data about the frequency and time spent at locations and may also include temporal information relating to times during the day when such visitation is made. In this way, the visitation history location matrix will contain information relating to cyclostationary daily habits of a mobile device user's visitation.

The context aware radio resource management system proceeds to 835. At 835, the path prediction system portion correlates the preliminary predicted path with the visitation history location matrix. The preliminary predicted path begins as a selected mobile device trajectory. In the example embodiment, this may be done via overlay of bin maps containing both preliminary predicted path and the visitation history information for locations near the preliminary predicted path. An example visitation history matrix bin map is shown in FIG. 9B below. Nearby locations for the visitation history matrix may be limited to those locations that fall within a certain number of bin map grid boxes from the preliminary predicted path. How many bin map grid boxes are used as nearby locations will depend on the physical size of each bin map grid box and factors such as how many future time intervals are used to determine the predicted future path.

The flow proceeds to 840 where the path prediction system modifies the preliminary predicted path locations based on the visitation history location matrix data. The path prediction system modifies the preliminary predicted path to include a location on the visitation history location matrix depending on the frequency of visitation to that location. Additional factors in modifying the preliminary predicted path may include the nearness of the frequently visited grid map box location to the preliminary predicted path. For example, a highly visited location one grid box away from the preliminary predicted path will cause a modification of the preliminary predicted path. However, a less visited location three or more grid boxes away from a preliminary predicted path location will unlikely cause a modification to the preliminary predicted path. The mobile path prediction system sets a threshold of factors to determine at what point the modification to the preliminary path will occur. Application of a set of conditional probabilities, such as with Bayesian classifier statistics, may take into account several variables such as proximity to trajectory and frequency of visitation to determine where to predict future path locations. Another factor having impact on modifying the preliminary predicted path includes the time of day. Time of day takes into account cyclostationary considerations such as daily routines of the mobile device user. The modification of the preliminary predicted path may occur in a recursive fashion to correlate additional probability estimation of a location along the preliminary predicted path until a predicted future path is determined.

In one embodiment of the application of determining the predicted path is based on probability that a mobile information handling system visits a location during a daily time interval. By way of example, probability of visiting a location may be determined as follows:

Probability of visiting a location$(x_i,y_i,t+\text{interval})$
=Historical Probability of visiting $(x_i,y_i,t+\text{interval})$*Normalized Distance Computation, where Normalized Distance Computation=$1/\text{SQRT}(2\pi)$*exponential(distance of a location from a preliminary path location);

and where

Distance=[Places Historically visited$(xi,yi,t)$−Predicted Location utilizing a Kalman Filter$(t+\text{interval})]^2/\sigma^2$.

$x_i$, $y_i$=potential locations visited during prediction interval
σ=variance in location prediction,
Interval=mobile prediction path time period.

The mobile path prediction system selects a path $x_i$, $y_i$ with the highest Bayesian posterior probability given the preliminary predicted path. Of course, other probability computations are also contemplated using distance from the preliminary predicted path and history of visiting a location in the user area.

At 845, the mobile prediction path system establishes the selected predicted path over the future time intervals including modifications from 840. Proceeding to 850, the mobile prediction path system applies the modified predicted future path to the bin map of the user area for the mobile device. This predicted future path and bin mapping is used by the context aware radio resource management system at later phases of radio link selection.

Figure 9A:
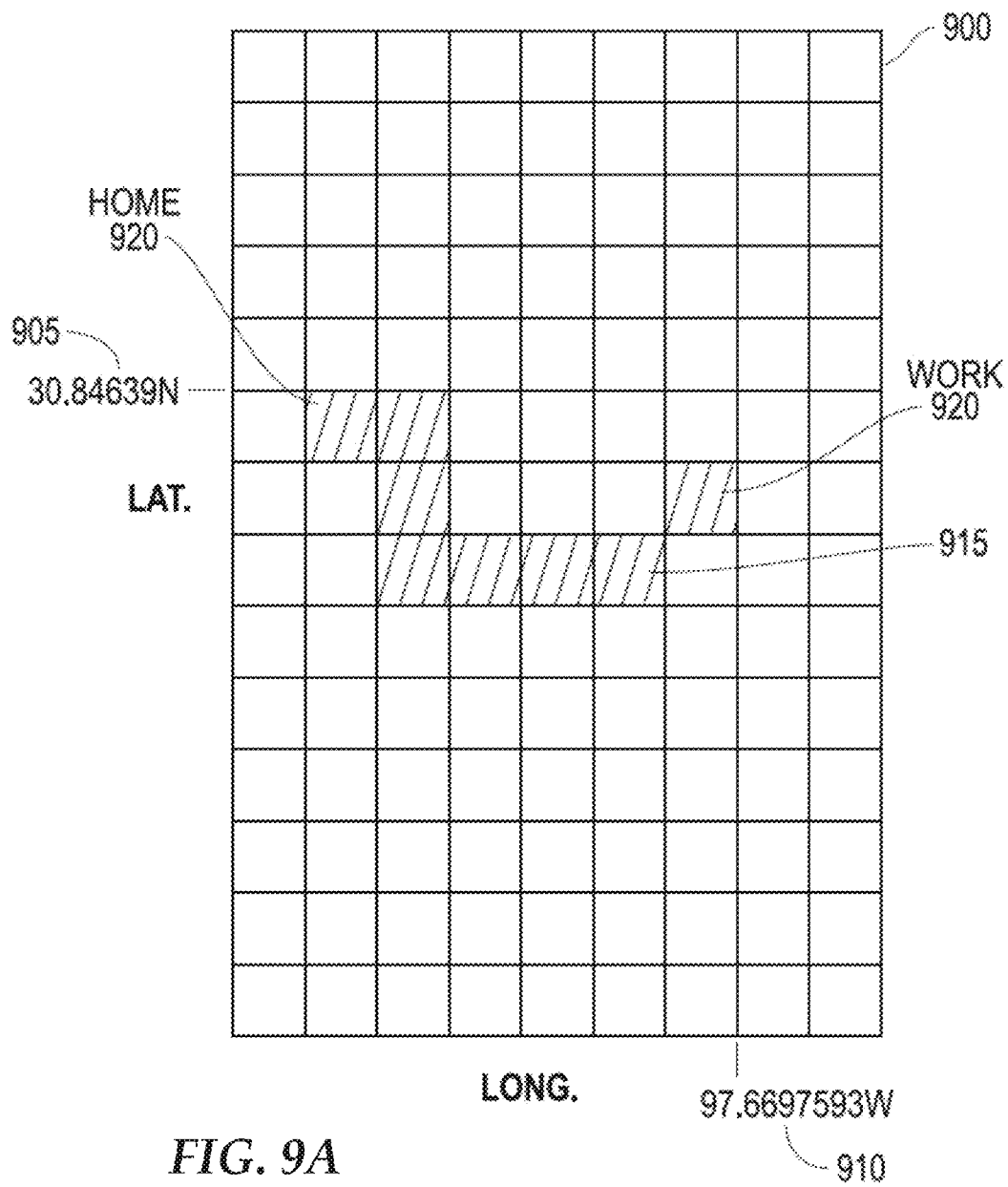
FIG. 9A is an example embodiment of a bin map for locations of a predicted path in a user area.
Figure 9B:
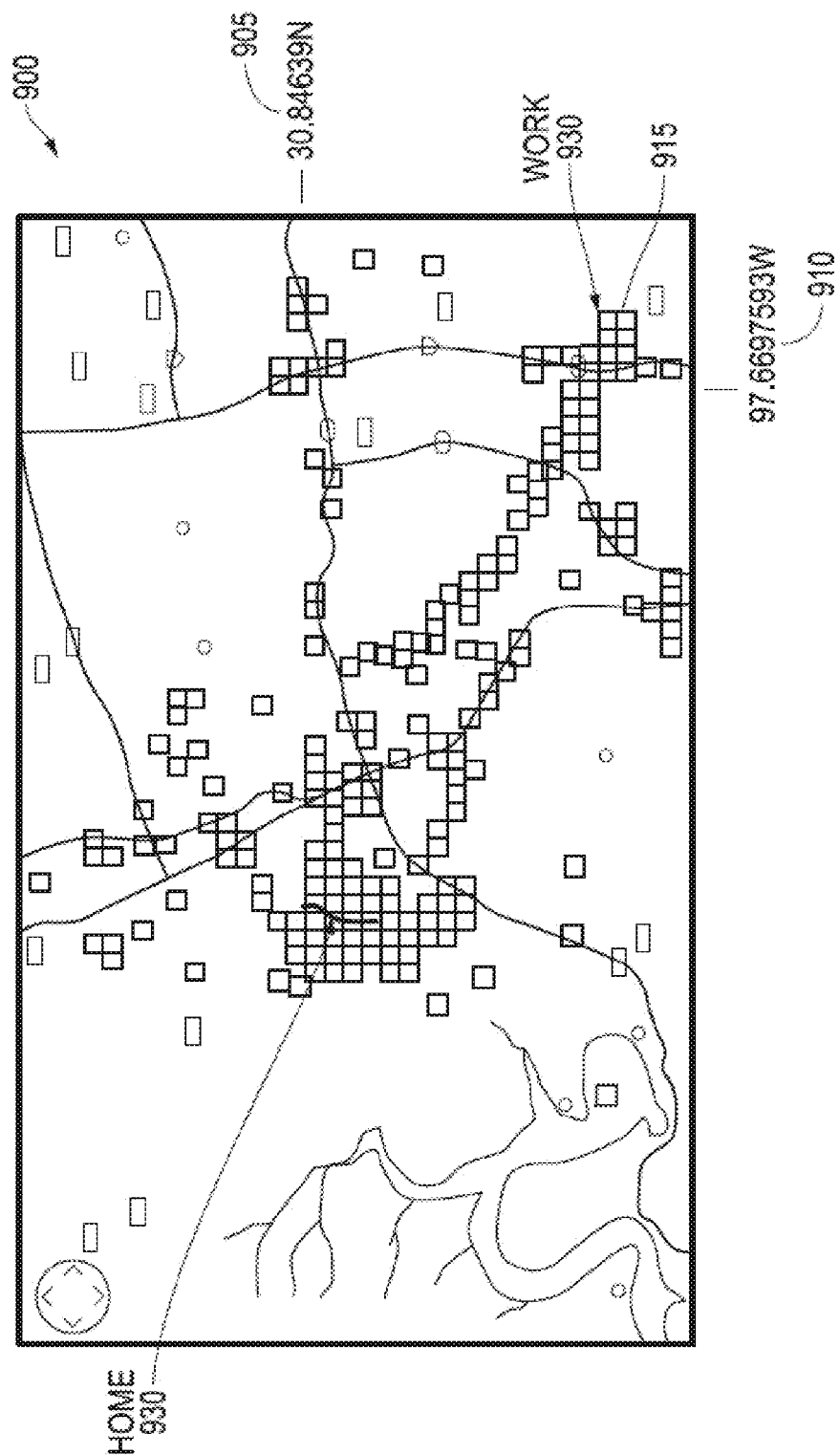
FIG. 9B is an example embodiment of a bin map for a history of visitation to locations in a user area.
Figure 9C:
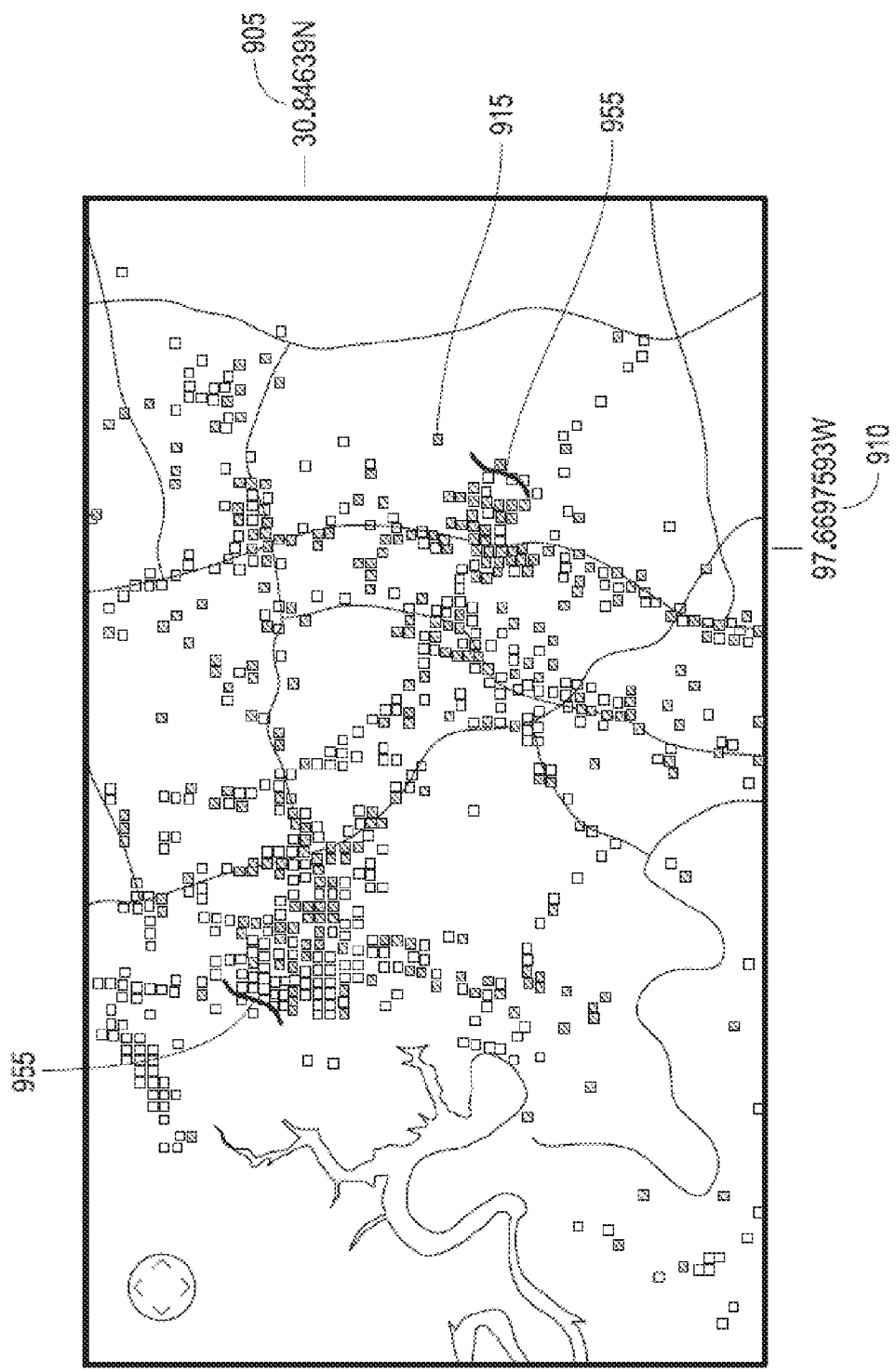
FIG. 9C is an example embodiment of a bin map for predicted QoS for a variety of wireless links at locations in a user area.

FIG. 9A depicts a bin map 900 with example latitude 905 and longitude 910 coordinates upon which several types of information may be set over the bin map by the context aware radio resource management system. The grid boxes 915 on the bin maps 900 of FIGS. 9A, 9B, and 9C, may determine the granularity with which a location is defined. In the example embodiment of FIGS. 9B and 9C the grid squares represent approximately one half kilometer by one half kilometer. The overlay grid square information may include a predicted future path 920 as shown in FIG. 9A. FIG. 9B depicts historic visitation matrix information 930 in an overlay of grid squares 915 on the bin map 900. Such grid squares identify locations visited by the mobile device. A third dimension, pattern or color indication (not shown) may be used to show frequency of visitation or ranges of visitation frequency applied to locations 915 on the bin map 900. Additional data may reflect the mobile device requirements at locations 915. The mobile device requirements reflect expected wireless service type usage at visited locations. Again, colors or patterns or a third dimension on grid boxes 915 may be used on the bin map 900 to show predominant usage expected at grid box locations on the bin map 900. FIG. 9C may show a bin map 900 having estimated QoS levels for the variety of wireless links available at grid box locations 915. As with the other bin maps, colors or patterns or a third dimension 955 on the grid boxes 915 may be used on the bin map 900 to show QoS ranges or energy consumption data for wireless link sources at depicted grid box locations. The measured QoS data and energy link consumption data is from a plurality of wireless intelligence reports for locations in the user area.

Figure 10:
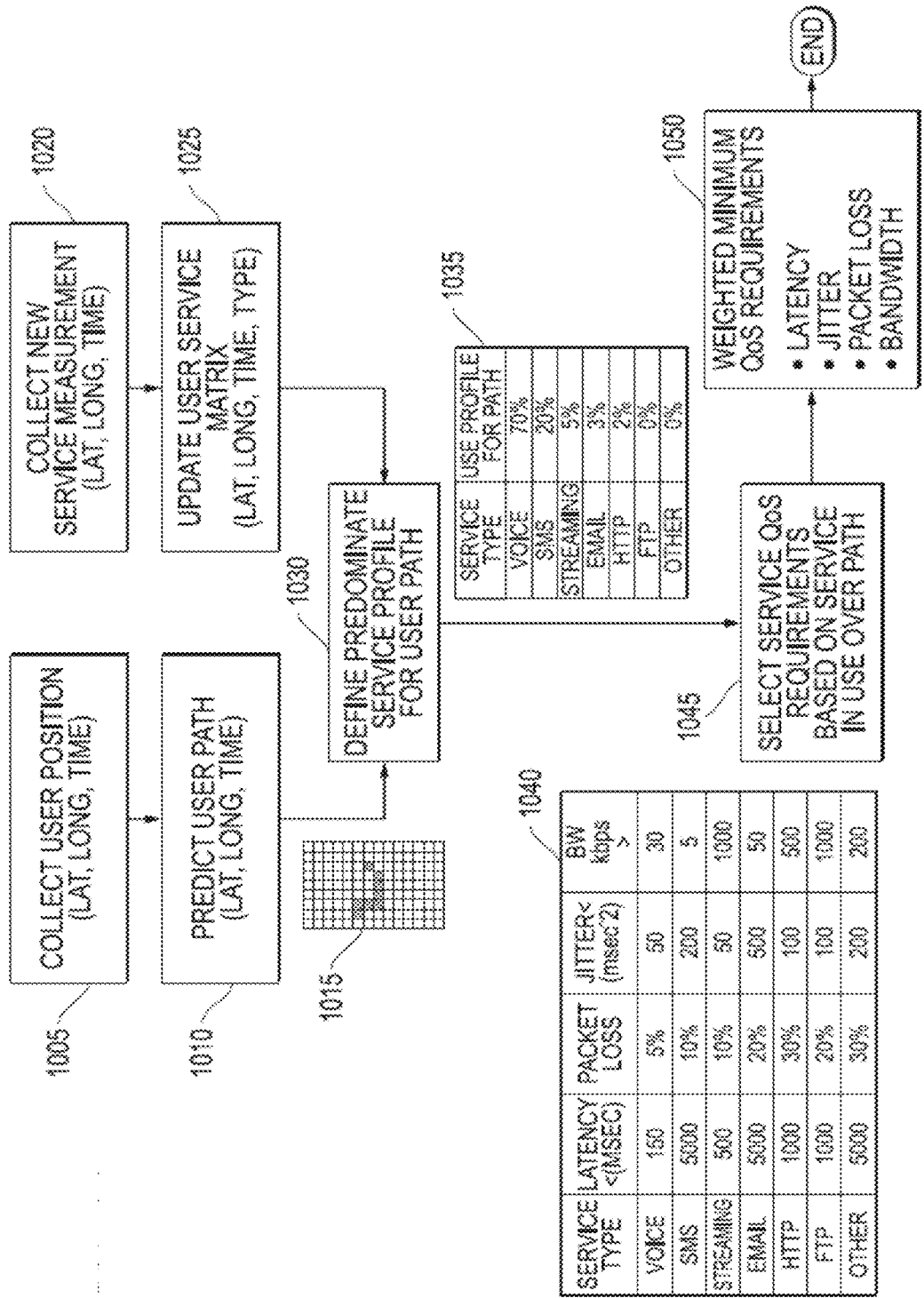
FIG. 10 is a flow diagram illustrating a method for determining mobile device wireless requirements along a path for a mobile device.

FIG. 10 shows a method for defining the expected minimum QoS requirements for the mobile device along a predicted future path. At 1005, the position of the user is determined including latitude, longitude and time to identify time and location of the mobile device. Proceeding to 1010, the system determines the predicted future path of the information handling system in accordance with the disclosures above. An example predicted path on a bin map with grid coordinate system is shown at 1015 similar to FIG. 9A above. At 1020, new data relating to wireless service types are collected by the system in accordance with disclosures above. This usage trend data updates the historical wireless service type profiles as part of the user profiles for locations in the user area at 1025. The user area may be of any scope. It is contemplated that a user area may be worldwide, within a country or state, or within a metropolitan area. In alternative embodiments the user area may be limited to an expected area of usage based on previous visitation history or realistic limits on likely travel in the contemplated future time interval. In a further embodiment, user area may be limited to areas within reasonable distance from the predicted future path of the mobile information handling system. Limiting the user area is helpful to reduce the data set used for analysis.

The flow proceeds to 1030 where the method compares the predicted future path with the historical wireless service type profiles for the locations in or near the predicted future path. This comparison of wireless service types used at locations along the predicted path is averaged and a predominant wireless service type profile is determined over the predicted future path. An example wireless service type profile is depicted at 1035 showing predicted percentages of use of wireless service types based on historical use at the locations in the predicted path. The predominant wireless service type profile for the path may be bounded with data from similar times of day to the predicted future path travel time. Alternatively, historical wireless service profile data may be taken for any daily time intervals such as when wireless service depends more strictly on location rather than time of day.

With a predominant wireless service type profile 1035 of expected usage types for the predicted future path, the method accesses policy settings for QoS requirements for service types. An example policy table for QoS requirements by service type is shown at 1040. The QoS requirements table shows the minimum requirements for various QoS parameters according to wireless service type. QoS parameters for this embodiment include latency, packet loss, jitter and bandwidth (BW). Tolerance levels are shown in this policy table for voice, SMS, streaming data, email, http downloads, ftp downloads, and other wireless data service types. In the shown example at 1040, voice service and streaming applications can tolerate very little latency (<150 msec and <500 msec respectively) or jitter (<50 msec$^2$) whereas SMS and email applications can tolerate substantially more latency (<5000 msec) and jitter (<200 msec$^2$ and <500 msec$^2$). For bandwidth (BW) however, voice requires comparatively low bandwidth (>30 kbps) similar to SMS and email, whereas streaming requires comparatively high bandwidth (>1000 kbps). With the predominant wireless service type profile 1035 for the predicted path determined, the method applies the QoS requirements policy at 1045. Proceeding to 1050, the minimum QoS requirements are weighted according to expected wireless service usage percentages over the predicted path. This may be achieved by multiplying the percentages of the wireless service type profile 1035 as weighting factors to the QoS requirements policy shown as 1040. In another embodiment, the method selects one or more predominant wireless service types that are expected to be used and selects for QoS criteria from the policy table 1040 based on the predominant wireless service type or types. By way of example in FIG. 10, the predominant wireless service types would be voice and SMS. At 1035 and 1040 the expected predominant usage would require relatively low latency (due to prominence of voice and to a lesser degree due to streaming), low packet loss (due to prominence of voice and SMS), and low jitter (due to voice). However, the QoS requirements would also only require a relatively low bandwidth (due to prominence of voice and SMS, and to a lesser degree email usage). This is applied unless a streaming application were detected to be actively in use as discussed more below. The usage trend determination system of the context aware radio resource management system performs the above described method.

Figure 11:
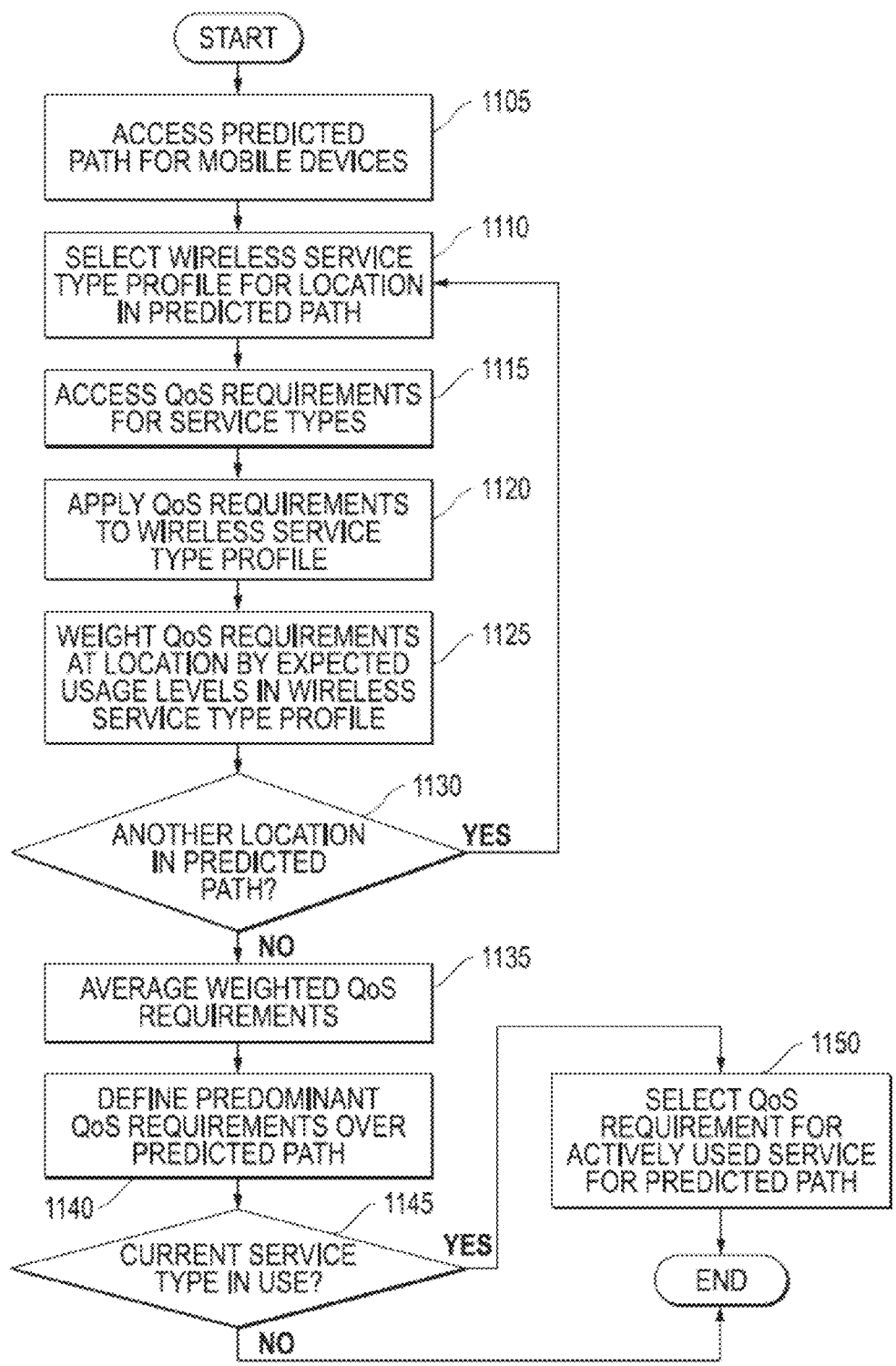
FIG. 11 is another example flow diagram illustrating a method for determining mobile device wireless requirements along a path for a mobile device.

FIG. 11 shows another method embodiment for defining the expected minimum QoS requirements for the mobile device along a predicted future path. The method begins at 1105 where the context aware radio resource management system predicts a future path, for example similar to that shown in FIG. 9A. The predicted future path for the mobile information handling system is determined according to the disclosures herein, for example in FIG. 8. The flow proceeds to 1110 where the usage trend determination system accesses a wireless service type profile matrix from mobile device user profiles for locations in a user's area. The usage trend determination system selects a wireless service type profile for a location in the predicted future path. Proceeding to 1115, the method accesses QoS requirements policy as set for a plurality wireless service types similar to the policy table 1040 shown above in FIG. 10. At 1120, the method applies the QoS requirements sufficient to provide wireless service to the plurality of wireless service types profiled for the location.

At 1125, method applies weighting to the QoS requirements from the policy settings according to expected wireless service type usage for the location. The flow proceeds to decision diamond 1130. At 1130, the method determines if there are additional locations in the predicted future path for the mobile information handling system. If so, the flow returns to 1110 to repeat the process for the next location in the predicted future path. QoS requirements for locations along the predicted future path may be applied to a bin map for grid square locations along the predicted future path.

If there are no additional locations in the predicted future path for the mobile device, the flow proceeds to 1135. The method averages the weighted QoS requirements for the expected usage levels over all locations in the predicted future path of the mobile device. With average weighting for all locations along the predicted future path, the usage trend determination system of the context aware radio resource management system can define a predominant set of QoS requirements over the predicted future path at 1140. This predominant set of QoS requirements is weighted by the wireless service type profiles for the predicted future path.

The flow proceeds to decision diamond 1145 where the system determines if one wireless service type is currently in use as the mobile device is about to enter the predicted future path. If not, the method ends. If so, the flow proceeds to 1150 where context aware radio resource management system adjusts the QoS requirements for the predicted future path according to the actively used wireless service. This acts as an override to determining QoS requirements for the mobile device that may contradict QoS requirements for the mobile device that is actively using a wireless service. At this point, the flow ends and the mobile device QoS requirements are determined for the predicted future path.

Figure 12:
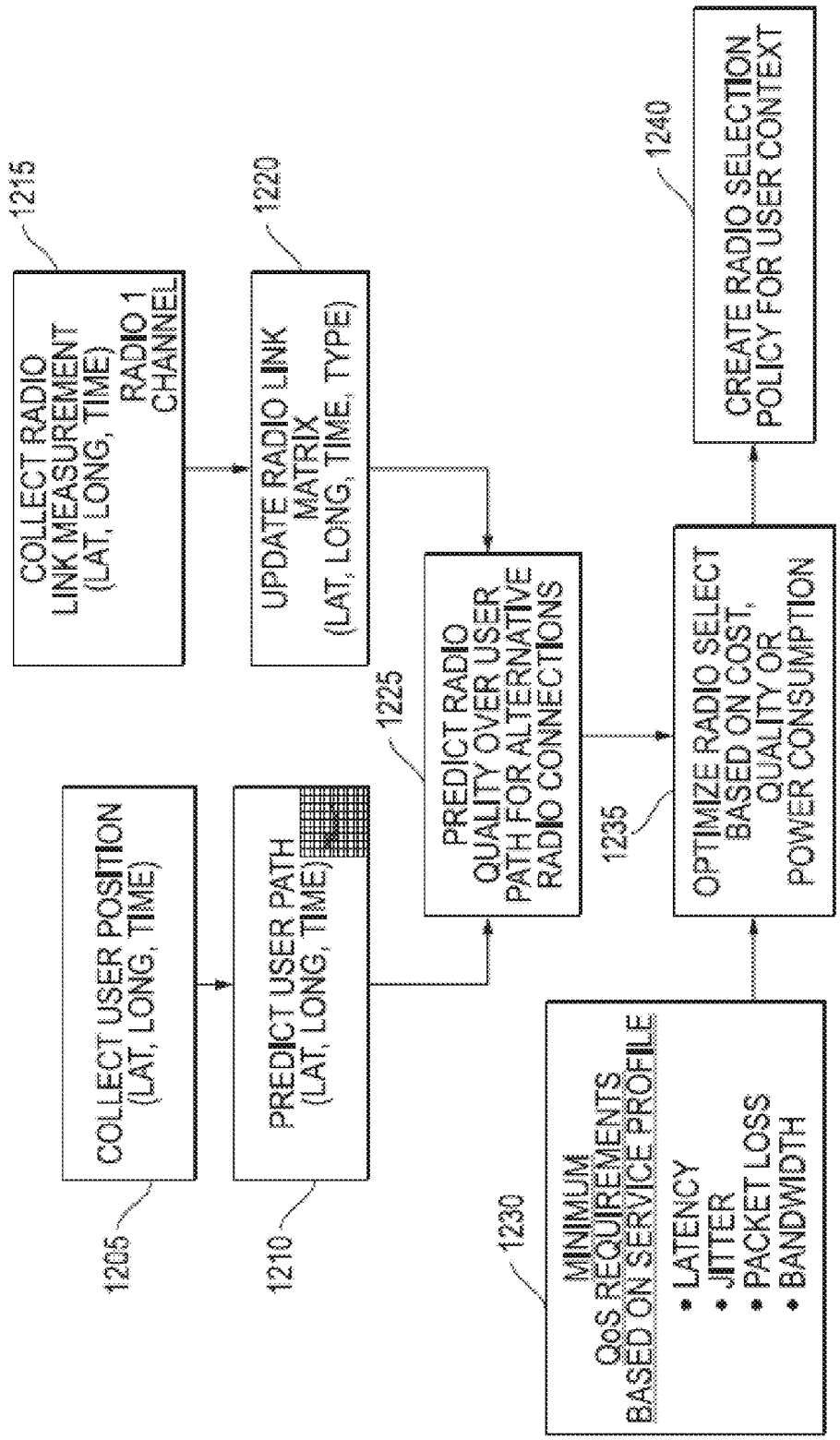
FIG. 12 is a flow diagram illustrating a method for estimating wireless link QoS levels along a predicted path.

FIG. 12 shows a method of predicting radio link quality of service, power consumption, and costs over the predicted user path for a plurality of radio connections. The method also shows utilizing the predicted radio link quality, cost and power consumption to select an optimized radio link and create a policy for linking or switching radio links for the mobile device. A wireless link QoS assessment system of the context aware radio resource management system utilizes a radio link matrix of spatial-temporal radio frequency profiles with QoS data collected for a plurality of locations in a user area. This radio link matrix data is used to determine estimated QoS scoring for radio channels at locations in the user area. An example of such a radio link matrix of radio link quality measurements is shown in FIG. 9C as depicted on a bin map of a user area.

At 1205, the position of the user is determined including latitude, longitude and time to identify time and location of the mobile device. Proceeding to 1210, the system determines the predicted future path of the information handling system in accordance with the disclosures above. At 1215, new data relating to radio link measurements according to location according to positional latitude and longitude may be collected from a plurality of mobile devices. The context aware radio management system may include crowd-sourced data for radio links or channels of radio connections. The new radio link measurements may also include a time component so radio service levels and quality of service may be measured according to time of day. Such collection of radio link measurements may be conducted in accordance with methods and systems described above.

At 1220, the radio link measurements are included in the matrix of radio link measurements according to location, time, and even type of radio service. Types of radio links can include a type of wireless link, such as Wi-Fi/WLAN link or macro-cellular wireless links such as 2G, 3G, 4G and similar future wireless links. Types of radio links may also include macro-cellular wireless links from a variety of service providers. Proceeding to 1225, the predicted radio link quality for a plurality of wireless links and service providers is determined over the predicted future path of the mobile device. This anticipated radio link QoS includes QoS parameters for locations along the predicted future mobile information handling system path. Additionally, average QoS parameters for all locations along the predicted future path may be determined for the wireless link types.

The flow proceeds to 1235 where the method compares predicted radio link quality for the predicted future path of 1225 with the minimum mobile device QoS requirements 1230, such as determined according to the method embodiments of FIGS. 10 and 11. At 1235, the wireless link QoS assessment system matches the parameters for the minimum mobile device QoS requirements 1230 in the predicted future path with the predicted QoS parameter levels for a plurality of radio links. In this way, an optimized radio link selection may be made at 1235 by the context aware radio resource management system. In the embodiment of FIG. 12, QoS of the radio link has been described as the overriding consideration for selection of an optimized wireless link at 1235.

Other factors may also be considered however in additional embodiments. State of the device and user-desired settings may also be assessed in selecting the optimized radio link at 1235. For example, the state of the battery level or access to a power source may be detected. Limited power supply levels may influence selection of a wireless link based on energy link consumption measurements as stored with the radio link matrix of spatial-temporal radio frequency profiles and used to predicted power consumption levels for the predicted future path of the mobile device. Additionally, cost of wireless link access may be considered when selecting a wireless link. For example, cost of access to macro-cellular wireless links may vary widely among wireless service providers. In another example, a Wi-Fi wireless link may be a free option that would be preferred by the user over a macro-cellular wireless link.

The flow proceeds to 1240, where the context aware radio resource management system creates a radio link selection policy based on the user location and usage context. This radio link selection policy may be transmitted as a recommendation to the user in one embodiment. In another embodiment, it may create a wireless link switching command subject to inhibitors or override settings as described above in FIG. 7.

In an alternative embodiment, locations or wireless links that cannot meet the minimum QoS requirements of the expected wireless service type usages by the may be designated by the context aware radio resource management system as dead zones, at least for a particular type of wireless link is unavailable or of such low QoS that it cannot be effectively used. These dead zones may also become part of the radio link selection policy as wireless links to be avoided.

Figure 13:
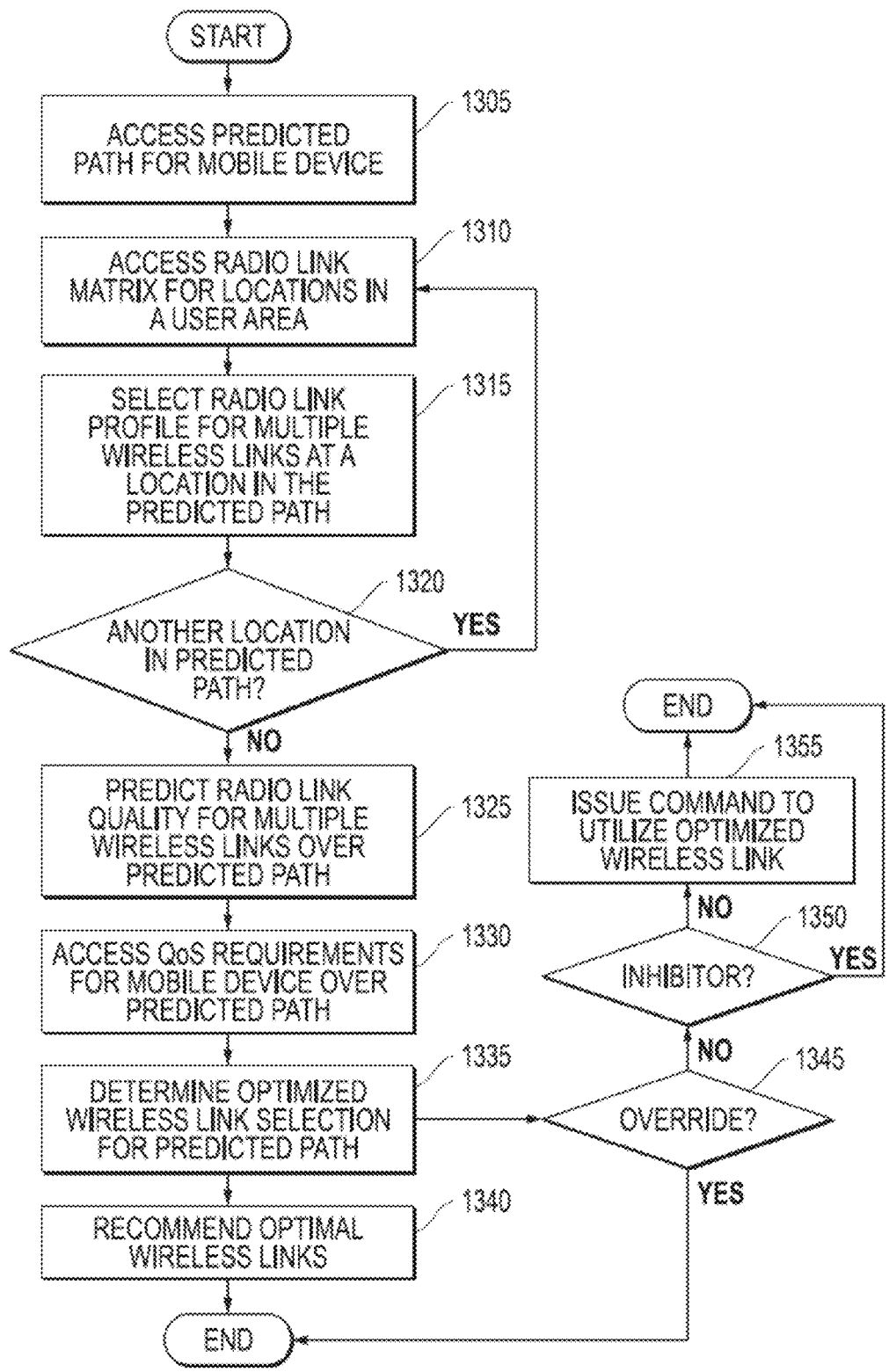
FIG. 13 is another example flow diagram illustrating a method for estimating wireless link QoS levels along a predicted path.

FIG. 13 shows another embodiment of a method for predicting radio link quality of service, power consumption, and costs over the predicted user path for a plurality of radio connections. The method also shows utilizing the predicted radio link quality, cost and power consumption to select an optimized radio link and create a policy for switching radio links by the mobile device.

The method begins at 1305 where the wireless link QoS assessment system of the context aware radio resource management system accesses a predicted future path for the mobile information handling system, for example similar to that shown in FIG. 9A. The flow proceeds to 1310 where the wireless link QoS assessment system accesses a radio link matrix for locations in a user's area. Proceeding to 1315, the method selects radio link profiles for multiple wireless links at a location in the predicted future path.

The flow proceeds to decision diamond 1320 where it is determined whether there is another location in the predicted future path for which a radio link profile has yet to be selected. If so, the flow proceeds back to 1310 to access the radio link matrix and select a radio link profile for the next location at 1315. If not, the flow proceeds to 1325 where the context aware radio resource management system predicts radio link quality for multiple wireless links over the predicted future path based on previously reported link quality from the radio link matrix. As described before, the radio link matrix may contain crowd sourced data measured from wireless intelligence reports and reported from a plurality of mobile devices that have visited the location. It includes QoS parameters such as latency, jitter, packet loss, and bandwidth. It may also contain information relating to power consumption for communication via the plurality of wireless links from energy link consumption profiles. And the radio link quality information may include a time component relating to time of day for radio transmission on the plurality of wireless links at a location. FIG. 9C shows an example of the predicted radio link quality in an overlay on a bin map of a user area.

The flow proceeds to 1330 where the context aware radio resource management system accesses the weighted QoS requirements for the mobile device over the predicted future path. These requirements are derived, for example, via the method embodiments described above with respect to FIGS. 10 and 11. FIG. 9C also illustrates an example bin map with an overlay depicting QoS requirements for the mobile device over the future predicted path. At 1335, the method matches the QoS requirements for the mobile device with the predicted radio link QoS parameters for the predicted future path of the mobile device. Matching the weighted QoS requirements for the mobile device, the system determines which radio links have predicted QoS parameters that most align with the weighted QoS requirements of the mobile device. Additional factors may be considered when selecting one or more optimized wireless links at 1335. The context aware radio resource management system may also determine battery power levels and match wireless links that will draw minimal power. In addition, the context aware radio resource management system may select among the cost of utilizing various wireless links when selecting which wireless link is optimal at 1335.

The context aware radio resource management system may then proceed to 1340, where the method transmits a recommended optimal wireless link or subset of links to a user to select whether to switch radio link connections. In one embodiment the process then ends. In an alternative embodiment, the method proceeds to decision diamond 1345 where the system determines if an override command or setting exists to prevent an automatic switch of radio link. If so, the flow ends with the override. If not, the flow proceeds to decision diamond 1350, where the context aware radio resource management system determines if an inhibitor would prevent switching of a wireless link. For example, a wireless link switch has recently occurred. For example, a time threshold since the most recent switching may be used to trigger an inhibitor. If an inhibitor prevents a switch of wireless links by the context aware radio resource management system, the flow then ends. If not, the context aware radio resource management system issues a command to switch to an optimal wireless link as determined for the predicted future path based on one or more factors of matching radio link QoS parameters to mobile device QoS requirements, power consumption, and cost.

Figure 14:
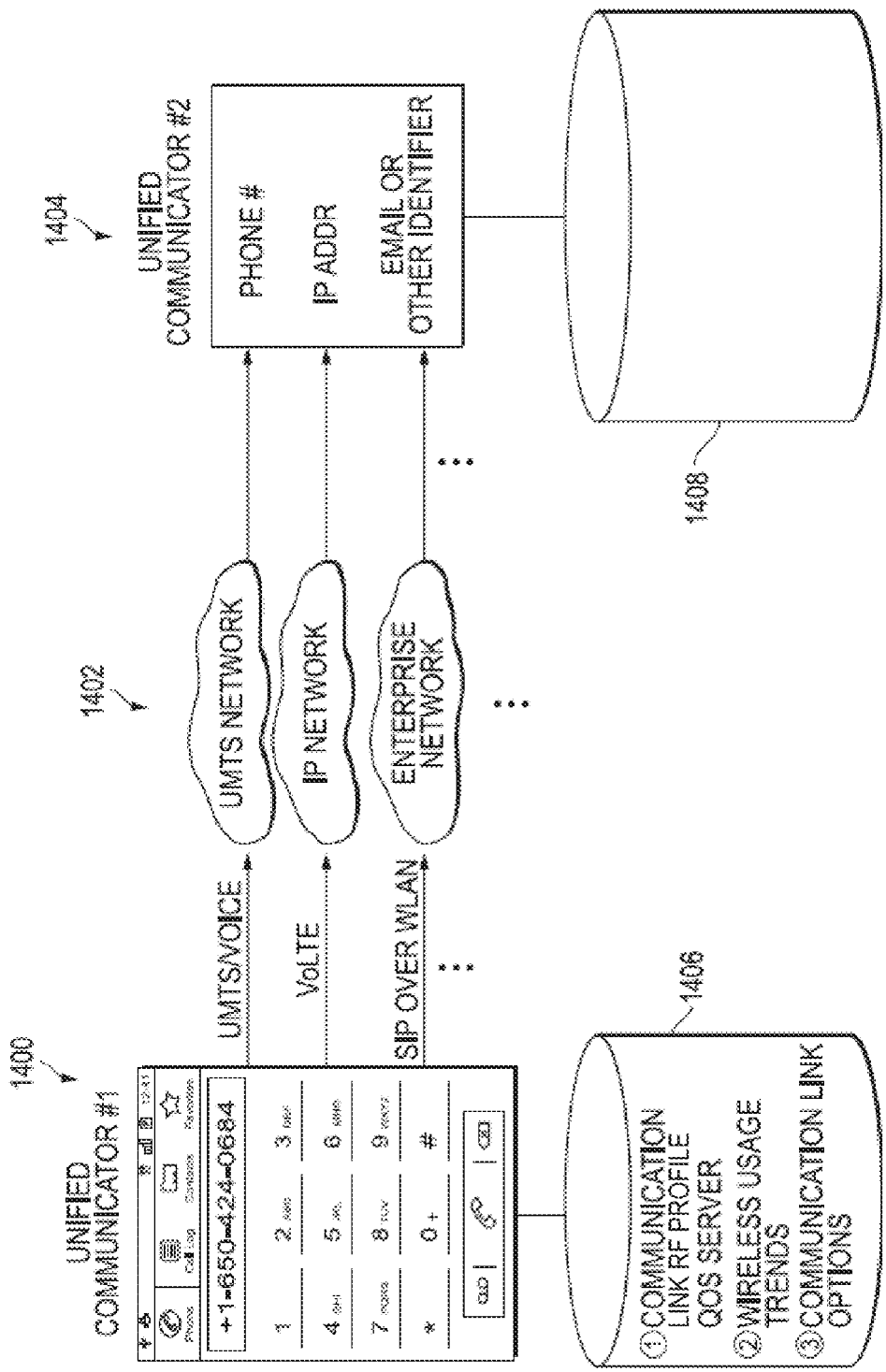
FIG. 14 is a block diagram illustrating a networked information handling system according to an embodiment of the present disclosure.

FIG. 14 shows a first unified communication system or first unified communicator 1400 that may operate on one or more information handling systems of a user according to one embodiment of the present disclosure. The information handling system having a first unified communicator 1400 is networked via a plurality of communication or data networks 1402 to a second unified communicator 1404 of a recipient user in an embodiment. In another embodiment, the first unified communicator 1400 may be networked to one or more information handling systems of a recipient user. None, some, or all information handling systems of the recipient user may operate a second unified communicator 1404. If a second recipient information handling system does operate a second unified communicator 1404 in some embodiments, communication of user data from the first information handling system of a user may identify the caller or user of the first unified communicator 1400 regardless of communication method selected under the embodiment described herein below.

Communication and data networks 1402 shown in FIG. 14 represent a plurality among several types of wireless link options including UMTS/voice communications, VoLTE via an IP network, or communication over a contained WLAN such as an enterprise network. It is understood that the communication and data networks shown in 1402 may be a combination of network types and not necessarily be physically separate networks. Communication and data networks 1402 may overlap and share similar or related physical connections, backbones, etc. in a variety of cases. Communication and data networks 1402 conceptually show a variety wireless link types for various communication methods available to the first unified communicator of information handling system 1400 when contacting a recipient user. Moreover, several different wireless link types may utilize the same networks, but may conceptually be different avenues of communication. For example, several VoIP options may communicate via one or more IP networks or other networks in 1402, and thus could be distinct wireless links of communication with a recipient user.

Unified communicator 1400 is shown and operates on one or more information handling systems associated with a user. As can be seen, unified communicator 1400 may include software commands executed via processor of one or more information handling systems to enable a user to dial a phone number, select contacts, select from a call log, choose favorites, answer a call, playback voice messages, etc. as would be with typical call software. However, first unified communicator 1400 allows additional functionality for communication with a recipient user at one or more information handling systems that may operate a second unified communicator 1404. For example, the first unified communicator may access data in database 1406 relating to wireless link options available for communicating with a recipient user. This may include wireless link options to be associated with a plurality of information handling systems associated with the user of the first unified communicator 1400. Additionally, the database may include access to the variety of wireless link options associated with a recipient user. In either case, data may also include the types of communication information handling systems available to a user or recipient user such as mobile smartphones, tablet computing systems, mobile computers, desktop computers, wearable mobile devices, vehicular mobile devices or other options.

First unified communicator 1400 is also connected to one or more databases 1406 that may include any of the context aware radio resource management system components and methods described above. For example, this may include access to user profile reports, as in 210, and radio frequency link reports, as in 220, energy link reports, predictive path and wireless use algorithms, etc. Radio frequency (RF) link reports may include data on individual radio QoS metrics or may include crowd-sourced mean opinion scores (MOS) on experience quality for given link types. MOS is a rating of 1-5 from bad (1) to excellent (5) of user experience using various wireless link types such as voice, audio, telephony, web browsing, etc. Promulgated by standards organization International Telecommunication Union (ITU) at recommendation P.800, MOS correlates data relating to wireless QoS metrics such as BER, latency, jitter and bandwidth or any subset of the same to a surveyed response from polled participants rating user experience when various levels of radio QoS metrics are present. This enables the first unified communicator to assess each available wireless link option with a recipient user, including a variety of service provider options for those links, and generate useful ratings that may used to rank wireless links. User profile reports include usage trends for times and location and may include user trends for communication method selections. Database 1406 may be part of local databases stored on a mobile information handling system or systems, part of protected enterprise network databases, remote networked databases, or any combination of the above. For example, database 1406 may draw from outside, networked based databases for collection and assimilation of broad level network intelligence reports and crowd-sourced data with active updating of network conditions and ratings while similarly drawing from a mobile device database containing user specific usage trend data.

According to embodiments herein, the first unified communicator 1400 may be instructed to contact a recipient user. First unified communicator system 1400 may access database 1406 which may indicate a selection of wireless link options 1402 for communicating with the recipient user. The wireless link options may further accommodate a variety of communication services/methods. The context aware radio resource management system as described above is made available to the first unified communicator 1400 or may operate in an information handling system as part of or along with the first unified communicator 1400. The context aware radio resource management system may also operate along with the second unified communicator 1404 or a recipient user information handling system in some embodiments to determine end to end communication conditions. Radio link profile reports, user profile reports, energy link reports, QoS reports on wireless links, MOS reports, and other types of wireless link data described herein may be accessed and include wireless usage trends by users of either or both the first and second unified communicator systems 1400 and 1404 respectively. Any subset of the above data relating to RF wireless link quality, capacity, traffic or user wireless usage trends may be factored, among other factors, into the communication link ranking and selection process by conducted by the first unified communicator 1400. The context aware radio resource management system considers end to end data for both the user and the recipient user mobile information handling systems and their connections with wireless link options.

Unified communicator system 1400 accesses policy settings for QoS requirements for wireless link types and service types via the context aware radio resource management system. An example policy table for QoS requirements by service type is shown and discussed above. The QoS requirements table shows the minimum requirements for various QoS parameters according to wireless communication service type. QoS parameters may include latency, packet loss, jitter and bandwidth (BW) requirements for a wireless link to reach a quality threshold. Other parameters are also discussed above herein. Upon correlation with user experience data according to the MOS standard, some of all of these parameters yield the mean opinion score (MOS).

In addition the first unified communicator 1400 accesses the context aware radio resource management system for user profile data, the wireless link radio frequency broadband traffic reports, energy link usage, battery power levels, and RF path prediction data in accordance with several embodiments described above. This may include the above QoS parameter ratings. MOS may instead be assessed for information of user experience opinion scores based on measured QoS statistics for given end to end wireless links or communications channels. MOS database information may be sourced from a number of users as with QoS and other metrics and accessed by context aware radio resource management system. Additionally in some embodiments, energy link reports may be received as a variation of the wireless link radio frequency broadband traffic reports. These inputs are assessed by the context aware radio resource management system software agent with respect to available wireless links for selection by the first unified communicator 1400 to communicate with a recipient user. The context aware radio resource management system software agent determines ratings of one or more optimal radio frequency technology protocols and service providers to be used for available wireless links. This determination is based, at least in part, on some subset of data in the input reports assessed by the context aware radio resource management system. Also, the settings such as what protocols are available, which protocols have been shut down, or what power is required to transmit on a given protocol are determined for the one or more mobile information handling systems operating the first unified communicator 1400. The above assessment may not be made only for the first unified communicator 1400 of the user, but may also be assessed with respect to data for the recipient user and the second unified communicator 1404. The wireless link ratings may be used to rank available wireless link options for communication with the recipient user.

A wireless link rating assessment may also result in a ranked list of service providers as described above for various wireless link options. For example, UMTS/Voice links via a UMTS network may be accessed for a plurality of wireless service providers. With a blend of user profile reports, radio frequency link reports, and other above-described data, each wireless link 1402 and each service provider may be given an overall rank between the first unified communicator and a recipient user. Service provider rating examples and wireless link rating methodologies are discussed in detail in several embodiments herein.

The selectable wireless links 1402 specifically available for a recipient user may be rated or ranked similarly to ranking of service providers methodology described above. For a matrix of available communication link options with a recipient user=[$UMTS_a$, $UMTS_a$, $VoLTE_a$, $VoLTE_b$, SIP/WLAN], an example user profile by wireless link type may be created with similar rating results to the above. The user profile shows the anticipated usage score from a location and time period. Also, a wireless link rating may result showing specific QoS score or MOS by wireless link option (and by service provider) at a location and time. The wireless link rating for a user profile in this example would result in factor similar to the service provider ratings described above. Altering the weight of factors may increase or decrease the relevance of certain aspects in the rating calculations. The basis of ranking the available wireless link options 1402 with a recipient user will depend on the user profile scores, wireless link ratings, and mobile broadband traffic reports among other factors outlined herein. How much weight is placed on any of these factors will change the calculations of the rating scores assigned. Additional factors may be included in rating calculations are understood to be available. These additional factors may include assessment of expressed preferences settings for communication, restrictions to filter rankings. Examples may be preferences for communication via voice with some recipient users, video conferencing with other recipient users, and text data communications with yet other recipient users. These preferences may also alter depending on time of day or location of the information handling system associated with the first unified communicator 1400. Restrictions may be based on energy usage, cost of wireless link usage, expected location, and convenience of communication types at that location (e.g., commuting in a car) among the other aspects described herein. These additional factors may influence the determination by weighting protocol options and, thus, influence the rating/ranking described. In other embodiments, settings or factors such as subscriber cost or expected location may be used to mask out wireless link options altogether.

User profile reports, such as those described herein, may include examples of spatial-temporal user trends for a mobile information handling system operating a first unified communicator 1400. Moreover, these user trend behavior measurements may be shown as a function of time and location as above. In certain embodiments, the user trend behavior recorded in user profile reports may also be specific as to trends by a user when communicating with one or more specific recipient users. For example, a user of the first unified communicator 1400 may generally tend to contact one specified recipient user using VoIP protocols for video conferencing. In an example, the user may be contacting other family with children at a distant location via video conferencing. In another example, a user may tend to contact a working group with which frequent video conference collaboration may be desired. Other communication trend examples with a recipient user may be recorded as well, including trends about which from among a selection of information handling systems of a recipient user that may yield a successful connection may be logged as part of a user profile reports. Examples of usage types may also include a variety of communication method or service options for voice, video streaming, audio streaming, email, and internet usage as described above in reference to the several figures herein. The unified communicators 1400 and 1404 may prompt users to provide preferences for communication methods with a recipient user. These preferences may be stored as part of the usage trend data in some embodiments or elsewhere in other embodiments. This enables the context aware radio resource management system to learn preferences of individual users.

The usage trend determination system may be location and time specific and, as described in embodiments above, may intersect with radio usage requirements and a radio link QoS or MOS assessment system to determine estimated QoS scoring or MOS scores for various wireless link options 1402 with a specific recipient user. This data is used by a unified communicator 1400 in selecting rank of wireless communication options with a recipient user.

Other factors may also be considered in additional embodiments. Cost of access may be an applied filter as described above to influence rankings or eliminate options altogether. State of the device (battery, processor activity, available wireless links) and user-desired settings may be assessed in selecting the optimized radio link. For example, the state of the battery level or access to a power source may be detected. Limited power supply levels may influence selection of a wireless link based on energy link consumption measurements as stored with the radio link matrix of spatial-temporal radio frequency profiles. Also, future path prediction at locations of travel may factor into selection or ranking of wireless link options with a recipient user by the first unified communicator system 1400.

Figure 15:
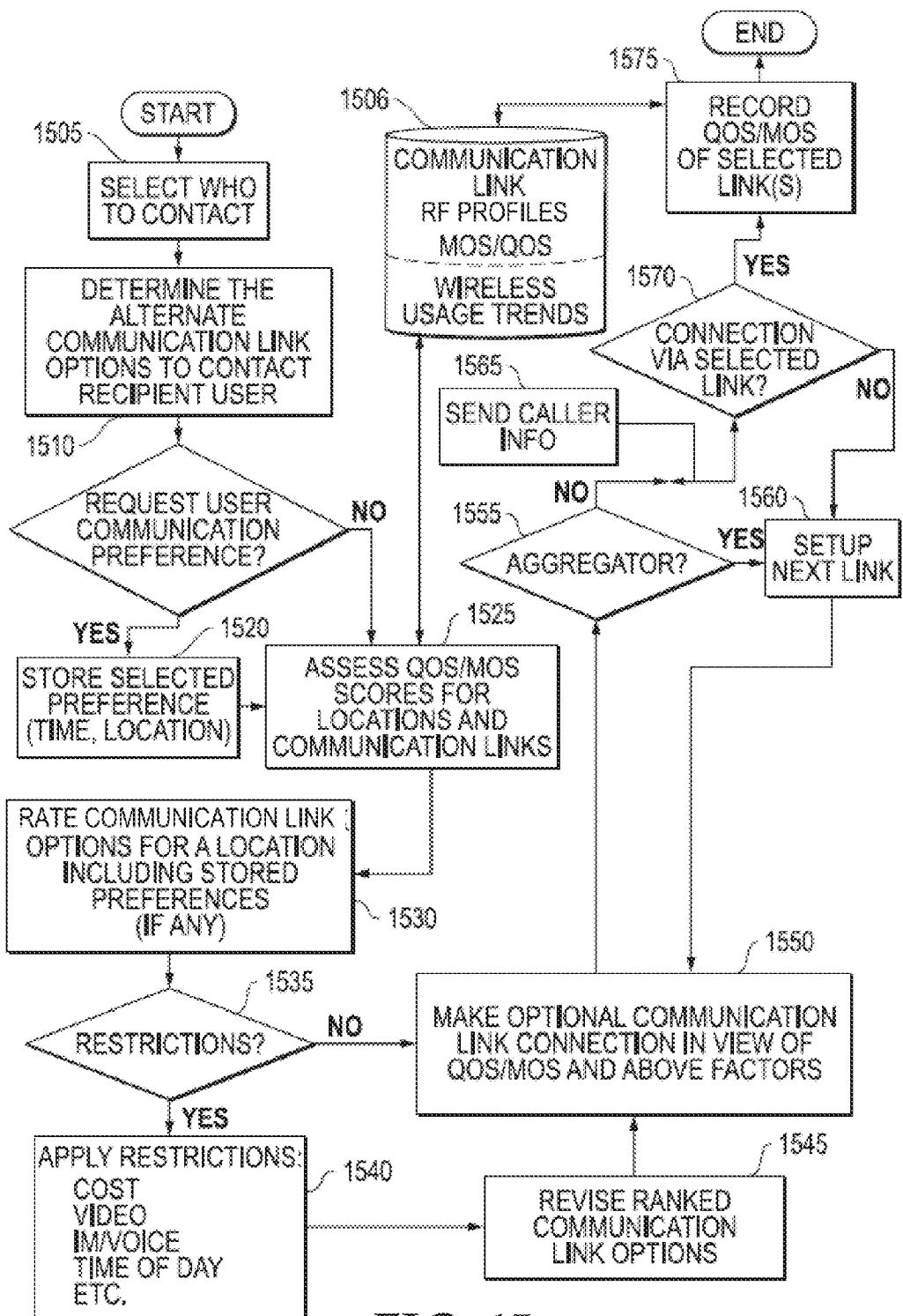
FIG. 15 is an example flow diagram illustrating a method for unified communication system operation according to an embodiment of the present disclosure.

FIG. 15 shows an embodiment of a method for selecting a wireless link from a plurality of wireless link options with a specified recipient user. The method also shows utilizing the predicted radio link quality, cost and power consumption to rate or rank optimized wireless links and create a policy for switching to one or more selected wireless links by the mobile device when a command to contact a recipient user is received by a unified communicator. Based on ratings or rankings, a wireless link may be selected for communications. This method in one or more embodiments may simplify communication with a recipient user by leveraging the context aware radio resource management system and prediction of radio link quality of service, broadband traffic levels, power consumption, costs, preferences and other factors.

At 1505, a user may select who to contact via a first unified communicator of an information handling system.

Proceeding to 1510, the first unified communicator accesses one or more databases including the context aware radio resource management system described above for user profile data, radio frequency link reports, the wireless link radio frequency broadband traffic reports, RF QoS assessment reports, MOS, energy consumption, mobile device path prediction and/or several other factors in accordance with the several embodiments described. Moreover, the time and location of the mobile device may be determined at this point. The unified communicator also accesses a database of potential wireless link options for reaching the selected recipient user at 1505. As described, the alternative communication link options may include communication via a variety of methods and communication along wireless and/ or wired protocols. The available communication link option may further include a selection of recipient user mobile devices, each with a plurality of available wireless link options, which may be contacted. In some embodiments, more than one recipient user mobile device may be contacted simultaneously according to communication methods selected or ranked by the unified communicator and the context aware radio resource management system. In this case a call aggregator may be deployed to determine if an option to establish a plurality of connections with a recipient user is desired for backup or other reasons.

At 1515, the first unified communicator system searches for and determines whether there is a user communication link preference for contacting the recipient user. This may include previously established settings made via the first unified communicator, or may involve prompting the user as to whether there is a preferred method to contact the recipient user. If a preference is expressed or found, that preference may override or, alternatively, substantially influence the outcome of the ranking assessment of potential wireless links by the unified communicator. A user preference may also be set by an administrator, such as an administrator for a company mobile device, or it may be a set by the user of a first unified communicator. If a user is prompted for a preference wireless link or communication method at decision point 1515, and a preference is expressed, then the system proceeds to 1520.

At 1520, the preference is stored in the user profile reports or other databases relating to usage trends. Information such as the time and location from which the contact is being made are recorded, as is the preferred method of communication at that time and location. Additionally, the preferences may be associated specifically with contacting the selected recipient user. In other embodiments, expressed preferences may be associated with any one or more of the selected recipient user, a time of communication, a location from which communication is being initiated, or a projected path during which communication may occur. This may be done in accordance with several embodiments as described above.

Once a preference is stored at 1520, then the preference is retrieved for use by the context aware radio resource management system as the flow proceeds to 1525. Alternatively, if no preference was received at 1515, then the flow proceeds to 1525 with previously stored preferences or no preferences if none were stored. At 1525, the unified communicator works in connection with the context aware radio resource management system and database 1506 to access crowd-sourced and other data relating to user profile data, radio frequency link reports, the wireless link radio frequency broadband traffic reports, RF QoS assessment reports, energy consumption, mobile device path prediction and several other factors. This may specifically include data including QoS data or MOS data for each of the available communication link options with the recipient user. The context aware radio resource management system works in connection with the first unified communicator to determine scores and rankings for the identified wireless links available for the recipient user. This data may be specific to location or predicted path, and time of day for the communication.

The flow proceeds to 1530 where the unified communicator ranks the identified communication link options for a recipient user. The ranking relates to location-specific and time-specific data for the request to communicate. Additionally, any expressed communication preferences in 1520, or previously stored communication preferences, are applied at 1530 to alter the rankings or make unavailable certain of the available wireless links with a recipient user.

At 1535, the first unified communicator accesses the context aware radio resource management system to determine if any additional restrictions have been placed on selection of a wireless link in some embodiments. If so, the unified communicator and the context aware radio resource management system applies the restriction or restrictions to a ranked list of communication link options or to rating of wireless links. Example restrictions may include a requirement to select the lowest cost option in some embodiments. Other restrictions may include a request for video conferencing, as opposed to simple voice or data communications, which would require the list of communication options to be video enabled. Other embodiments may require voice or data messaging to be a priority over high data-consuming applications such as video conferencing. Factors such as time of day or location may also trigger application of restrictions. In an example embodiment, determining that the time and location is a during a commute may apply restrictions on video conferencing or data messaging such as IM. Other restrictions described elsewhere herein may be applied in a variety of embodiments as is understood.

Proceeding to 1545, the rating or ranking of wireless link options with the recipient user is revised according to the restrictions applied in 1540. It is further understood that the unified communicator and the context aware radio resource management system may apply the restrictions, user profile data, radio frequency link reports, the wireless link radio frequency broadband traffic reports, RF QoS assessment reports, MOS, energy consumption, mobile device path prediction, preferences, restrictions and other factors in any order and the order described herein for FIG. 15 is not limiting. It should be understood that the unified communicator and the context aware radio resource management system may apply these factors to the retrieved list of available wireless links for a selected recipient user in any order or simultaneously. Application of the restrictions may apply first in one example embodiment, followed by application of crowd sourced or individual user experience data from radio link profile reports and user profile reports to establish a ranking of wireless link options with a recipient user, which may then be revised by preferences of communication methods. Any order of application of the above factors by the unified communicator and the context aware radio resource management system is contemplated. Similarly, many factors may be applied simultaneously or require no particular order of application whatsoever. The order described in FIG. 15 is for illustrative purposes.

If no restrictions are applied at 1535, or the ranking of communication links is revised at 1545, then the flow proceeds to 1550 where the unified communicator may request to establish a link on the highest ranked or a highly-rated wireless link to reach a recipient user via a corresponding network. Highly-rated may include a rating above a certain threshold or an MOS above a certain score for example. This may be preceded in some embodiments by prompting a user of the first unified communicator system to accept or reject the selected wireless link with the recipient user. In other embodiments, a list of highly-rated wireless links may be provided to a user after the above factors have been applied. In yet other embodiments, the unified communicator may automatically submit the request to link with the recipient user via a corresponding network without prompting for verification.

At 1555, the unified communicator determines if an aggregator system is active and requires additional wireless links to be set up with a recipient user. For example, an aggregator system may establish a plurality of links for critical communications whereby if a call or video conference link is dropped, a backup link is immediately available. Seamless switching to the backup link will occur in some embodiments. An aggregator may also establish a plurality of links for a situation where a user is mobile and may elect to communicate via one communication link in one location, but then switch to the alternative communication link as travel continues. In an example embodiment, a WLAN or Wi-Fi link may be used initially at a location in the beginning of a communication, but have a back up link established, such as UTMS. Should the user move to a location outside of the WLAN or Wi-Fi range during the communication, automatic switchover to the backup communication link will allow communication to continue with the recipient user without interruption or with notification of the switchover.

If the aggregator is active at 1555 and requires an additional link or links to be established, the flow proceeds to 1560. At 1560, the unified communicator selects another wireless link option with the recipient user from the ranked list established via the context aware radio resource management system as modified by the first connection attempt. Additional restrictions and preferences may be applied after a first wireless link has been selected. It is understood that in some embodiments, the previously selected link is omitted from selection of a second link via the aggregator. Additionally, other restrictions and limitations may be applied to selecting another wireless link in some embodiments. For example, a restriction may be applied limiting the second aggregated link to be of a like kind to that of the first. For example, if the first selected wireless link is video, voice, data messaging, etc., then a similar link type may be selected second to enable seamless switchover if necessary. In other example embodiments, a restriction may be applied to limit the second aggregated link to be of a different kind of communication link or carried on a different service provider to provide better diversity of options should one network or link type experience failure. Several restrictions or limitations may filter the selection of a second or even a third communication link via the context aware radio resource management system depending on the set of priorities applied at 1560.

If aggregation is not applied at 1555, the flow proceeds to 1565 where caller information may be send by the first unified communicator to the recipient user. The caller information may be a packet of data that indicates the identity of a user of the first unified communicator regardless of which wireless link or wireless links are selected for communication. While similar to a caller id type system, the first unified communicator may send caller information identifying the user to a second unified communicator at one or more recipient user mobile devices. The unified communicator system is agnostic as to which communication link option or link options were selected and will identify the calling user to the recipient user regardless of the communication protocol selected of the service provider used. Thus, when a VoIP or another communication method is selected that does not provide user information or provides an ip address or main phone number, the unified communicator system described herein provides a packet of data, regardless of the wireless link type used for communication, with identifying information of the user of the first unified communicator initiating the communication.

At 1570, the first unified communicator is notified whether a connection via the selected wireless link is successful. If not, the flow returns to 1560 to set up an alternative link and proceeds to 1550 to access the ranking of communication links as before. The failed selection will be removed from the ranking in some embodiments before a second selection is made by the unified communicator. In some embodiments, a prompt may be provided to the user of the first unified communicator to approve making another attempt to reach the recipient user.

If a connection is successful at 1570, the flow proceeds to 1575 where the context aware radio resource management system will record data of the communication for QoS metrics, energy consumption data as well as recording the usage trend data from the communication with the recipient user. This data may be returned to a private database for the user, or some or all of the tracked data may be submitted for crowd-sourcing purposes to improve the continued accuracy of context aware radio resource management system. Recording of such data may be done in accordance with disclosures herein and in the cited applications relating to the same.

The context aware radio resource management system may furthermore be utilized to improve quality of wireless links made available to client information handling systems by service providers or carriers. Users of client information handling systems may utilize one of several broadband wireless service providers as discussed above to establish a wireless link with a recipient user. The service provider or carrier providing a wireless access capability will utilize a network policy engine to drive selection and access to its radio assets. These policies or rules of access are referred herein as network selection policies or network access policies of the service providers. The service provider may set priorities of wireless link protocols, including driving use of certain network assets, which play a part in setting these network access polices. The network access policies are enforced upon network access requests made by client devices. Often, however, these network access policies of the service providers are agnostic of the end to end experience or quality of the wireless links prioritized in the policies. The network access policies may be made based on service provider network statistics for traffic or RF QoS data or other link QoS data from within the portion of the end to end link controlled or available to the service provider. For example, network QoS and traffic information may be limited to cell-level criterion of analysis. This may not provide the complete picture. This end to end ignorance of the user experience of a service providers wireless links can result in sub-optimal network wireless links being enforced in policies provided from the service providers to client information handling systems seeking access. As a result, the context aware radio resource management system in client information handling systems of the current disclosures may provide feedback to service provider about the end to end experience for a user client device at a location or projected location path and during given times. The spatial temporal RF profile reports and user profile reports of context aware radio resource management systems described above contain data enabling a user client device to obtain ratings of wireless link options available to it. This may include multiple options available from a specific service provider. Furthermore, according to the various embodiments described above, these wireless link options may be ranked to assist selection of more optimal or efficient wireless links for communication. Feedback such as QoS ratings, MOS ratings for a service provider's wireless links from user client devices may assist in developing and enforcing network access policies with user client devices seeking access that provide better connection offerings to users.

Example radio assets that may be owned by a service provider may fall into two or more classifications. They may be classified, for example, as some of which fall under the Third Generation Partnership Project (3GPP) family of standards protocols (GPRS, UMTS, EDGE, HSPA, LTE, LTE Advanced, etc.) and others may be non-3GPP wireless link protocols such as WI-FI, CDMA2000, or enterprise networks (e.g., fixed networks). Network access policies of a network service provider may prioritize accessibility by a client user device from among the protocols available from a service provider. In example embodiments, this may include from among any of the above wireless link protocol types. Improving the priority settings of service provider wireless link types in the network access policies with crowd sourced and individual user data collected regarding end to end experience permits improvement of end user experience with service providers wireless communications.

Figure 16:
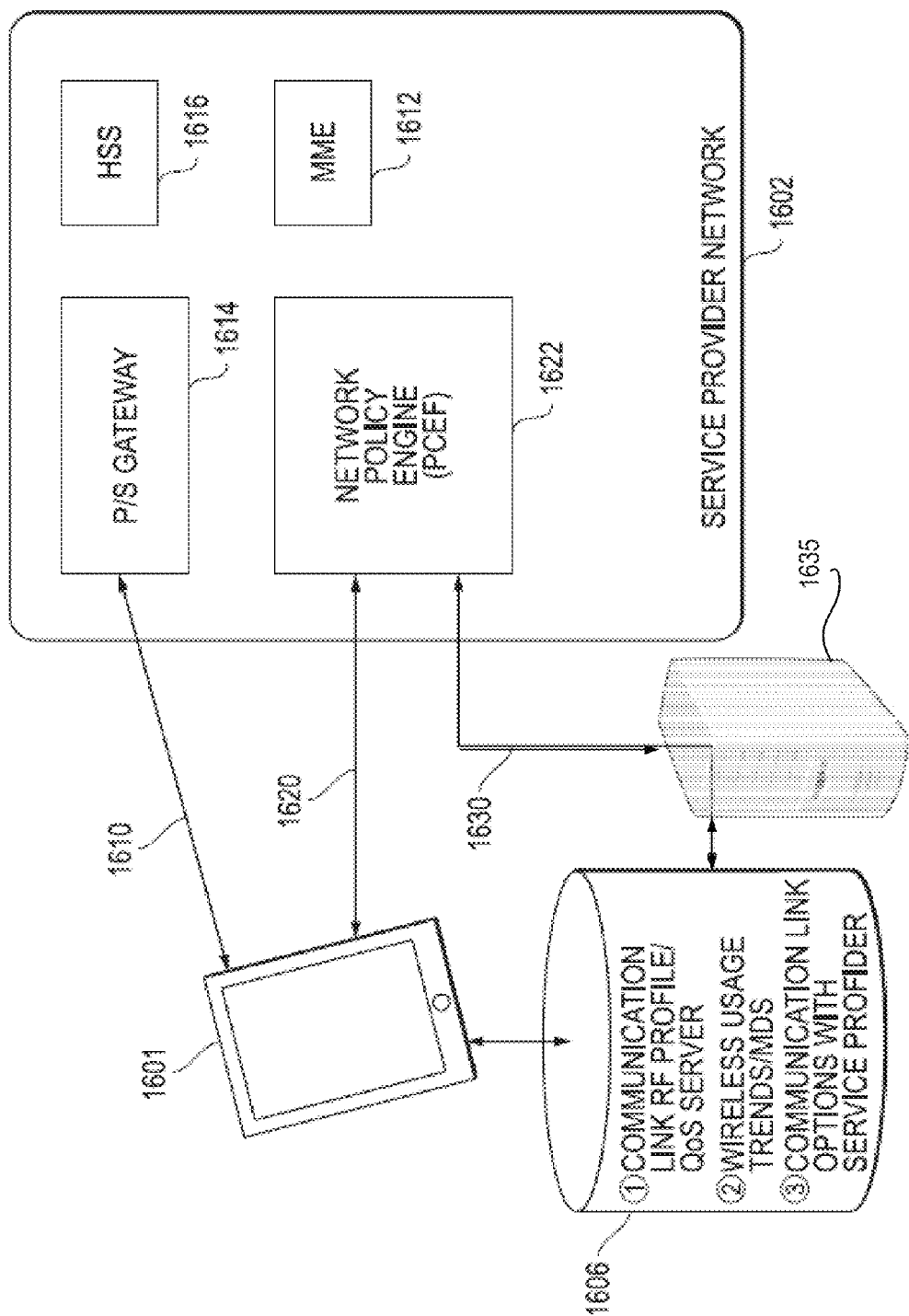
FIG. 16 is a block diagram illustrating a networked user information handling system and service provider access control node according to an embodiment of the present disclosure.

FIG. 16 shows a client user information handling system 1601, which may include the mobile devices such as those described herein. Client user information handling system 1601 will have an application processor and wireless adapter for accessing and communicating with wireless links 1610 of a service provider network 1602. Service providers or carriers may include any of a multitude of broadband wireless carriers such as AT&T, Sprint, Verizon, among other options known to those in the art. The same wireless adapter or a different wireless adapter or network adapter may communicate via link 1620 with network policy engine 1622 operated within service provider control node or access node information handling systems. Network policy engine 1622 works in connection with the network access control node 1612 of a serving gateway 1614 for granting network access to a client user information handling system 1601.

In an example embodiment, the evolved packet core (EPC) of the LTE standard utilizes a Policy Control Enforcement Function (PCEF) 1622 for enforcement of network policies regarding priority of network access types for grant to client devices 1601 requesting access. It works in conjunction with the primary Mobility Management Entity (MME) 1612 and Home Subscriber Server (HSS) to orchestrate granting or denying access to a wireless link on one or more protocols of a service provider's network 1602. The EPC of a service provider may also provide information to the client user device 1601 about rules or network access policies as well as connectivity options for both 3GPP and non-3GPP available wireless links via the Automatic Network Discovery and Selection Function (ANDSF). In the EPC, the gateway 1614 may be either a serving gateway or a PDN gateway for connecting with external networks. User authentication module 1616, such as the HSS contains user and subscription related data for user authentication and access verification to the service provider network. In EPC, the access verification and user authentication may be to the LTE network or to other wireless link protocol options. In the LTE embodiment, the EPC and MME may orchestrate handover and mobility among a variety of 3GPP protocols available from the service provider. Handover may be managed as well for mobility with non-3GPP protocols. Other analogous systems to the above for implementation of a network policy engine and network access policies are understood to be available besides the EPC/LTE standards based system.

As with FIG. 14 above, communication and data networks 1602 are shown to represent a single service provider network, but may represent a plurality of types of wireless links and data networks of that service provider. Moreover, the link rating feedback by the context aware radio resource management system of the present embodiments may occur with a plurality of broadband network service providers. A variety of communication methods may be available to the user information handling system 1601 when contacting a recipient user. In an example embodiment, the plurality of wireless link types for a service provider may include one or more of each of UMTS/voice communications, VoLTE via an IP network, or communication over a contained WLAN such as an enterprise network. Communication and data networks of a variety of types in 1602 may overlap and share similar or related physical connections, backbones, etc. Moreover, several different communication types may utilize the same networks, but may conceptually be different avenues of communication and thus different wireless link options. For example, several VoIP options may communicate via one or more IP networks or other networks in 1602, and thus could be distinct wireless links with a recipient user.

In an embodiment, user information handling system client 1601 operates a network policy interface management system (not shown). The network policy interface management system may operate as a set of instructions executed via an application processor on the user information handling system client 1601 itself or on a virtual server associated with a user or a plurality of users. The network policy interface management system works in connection with context aware radio resource management system to manage received network access policy requirements from service providers into the wireless link selection process for the client user device. In an embodiment of the present disclosure, the network policy interface management system enables the context aware radio resource management system of a user client device to provide service provider feedback to the access control node and gateway of a service provider wireless network 1602. As discussed in the embodiments below, the feedback may include information on service provider wireless link ratings or rankings. This enables the context aware radio resource management systems described above to work in concert with the network policy engine, network access control node and the service provider to improve the network access policies set for the service provider network 1602.

The context aware radio resource management system of user client information handling system may access a database 1606 relating to wireless link performance ratings. Database 1606 may include any of the context aware radio resource management system components and methods described above. For example, this may include access to user profile reports, as in 210, and radio frequency link reports, as in 220, energy link reports, predictive path and wireless use algorithms, etc. User profile reports may include usage trends for times and location of a user or client device usage, but may also include crowd-sourced mean opinion scores (MOS) on experience and quality for given link types in end to end communications. Database 1606 may be a networked database for collecting crowd sourced data from users of various wireless networks, or may be local databases stored on a mobile information handling system or systems, or may be protected enterprise network databases, or may be a combination of any of the above. Database 1606 may also draw from both closed and secure inside databases and outside, networked-based databases for collection and assimilation of crowd-sourced data and active updating of network conditions and ratings.

Database 1606 is used by the context aware radio resource management system to access both crowd-sourced data and individual data including link radio frequency profiles, QoS data from a client perspective, wireless usage trends by individuals and network users. MOS ratings, and energy link reports. Access to database 1606 enables the context aware radio resource management system to assess each available wireless link option offered by a network service provider. The context aware radio resource management system may then generate a useful rating or ranking for the variety of service provider wireless link options similar to the methodologies described above for those links.

Database 1606 may also be used to determine which wireless links are specific to a service provider so that ratings feedback may be specifically tailored to the service provider's wireless links In addition network policy interface management system accesses the context aware radio resource management system for user profile data, the wireless link radio frequency broadband traffic reports, energy link usage, battery power levels, and RF path prediction data in accordance with several embodiments described above. Additionally in some embodiments, energy link reports may be received as a variation of the wireless link radio frequency broadband traffic reports. These inputs are assessed by the context aware radio resource management system software agent with respect to available links offered by a network service provider. The context aware radio resource management system software agent determines a rating of optimal radio frequency technology protocols of the service provider available wireless links. These ratings may be then used to develop rankings of service provider available wireless links. The rating and ranking determination is based, at least in part, on some subset of data in the input reports assessed by the context aware radio resource management system. Also, the settings such as what protocols are available, which protocols have been shut down, or what power is required to transmit on a given protocol are determined for the client mobile information handling systems 1601. The above assessment may not be made only for the client mobile information handling systems 1601, but may also be assessed with respect an end to end communication with a recipient user.

A wireless link assessment may result in a ranked list of or individual ratings of wireless link protocols as described above specific to a service provider. For example, the selectable wireless links 1610 specifically available to a client device 1601 may be ranked or rated similar to the example rankings or rating between service providers above, except specifically for one service provider to provide a feedback report to the access control node and network policy engine of the service provider. For a matrix of available service provider communication link options may be [$UMTS_a$, $UMTS_a$, $VoLTE_a$, $VoLTE_b$, SIP/WLAN]. An example user profile by technology may be created with results similar to techniques above. The user profile may show an anticipated usage score from a location and time period of the service provider wireless links available. A link rating, derived similarly to the above, may result showing a quality of service QoS score by the service provider's wireless link options at a location and time. Mean opinion scores (MOS) provided by users or user client devices may also be included in developing ratings for wireless links. As before, altering the weight of factors may increase or decrease the relevance of certain aspects in the rating calculations. The basis of ranking or rating the available wireless link options for a service provider will thus depend on the user profile scores, wireless RF link profiles and ratings, and mobile broadband traffic reports. How much weight is placed on any of these factors will change the calculations of the ranking scores assigned. However, this provides a clearer end to end user experience rating than that provided from within the service provider network systems. Additional factors may be included in rating calculations are understood to be available. These additional factors may include, in example embodiments, assessment of expressed preferences settings for communication, restrictions to alter ratings or filter rankings as described with respect to FIGS. 14 and 15.

The usage trend determination system may be location and time specific and, as described in embodiments above, may intersect with radio usage requirements and a radio link QoS assessment system to determine estimated QoS scoring for various wireless link options of a service provider. Mean opinion scores (MOS) may also be assessed for information of user experience for given end to end wireless links or communications channels. MOS database information may be sourced from a number of users as with other metrics and accessed by context aware radio resource management system from databases 1606. This data is used by the network policy management system to rate wireless link options of a service provider and transmit such feedback via 1620 to a network policy engine 1622 such as PCEF.

In an alternative embodiment, database 1606 is an accessible database such that it may be accessed directly 1630 by the network policy engine 1622 to retrieve wireless link rating or rankings to assist with network access policy reprioritization. For example, aspects of database 1606 that include crowd-sourced information from multiple sources may be directly accessible by network policy engine 1622 in some embodiments. In other embodiments, usage trend data and preferences of a user or user client device 1601 may not be directly accessible from a remote database 1606, but may be accessible through access from user client device 1601. Splitting accessibility of personal user data from crowd sourced or other open network relevant data may permit security measures to apply to user-specific data used by the context aware radio resource management system of user client information handling system 1601 in some embodiments.

Other factors may also be considered in additional embodiments. Cost of access may be an applied filter as described above to influence rankings or eliminate options altogether and work closely with a service provider's policy and charging control functions (PCC) under the EPC of LTE to determine potential costs for access and usage. State of the device (battery, processor activity, available wireless links) and user-desired settings may also be assessed in selecting or rating the optimized wireless link of a service provider as described above in other embodiments.

Figure 17:
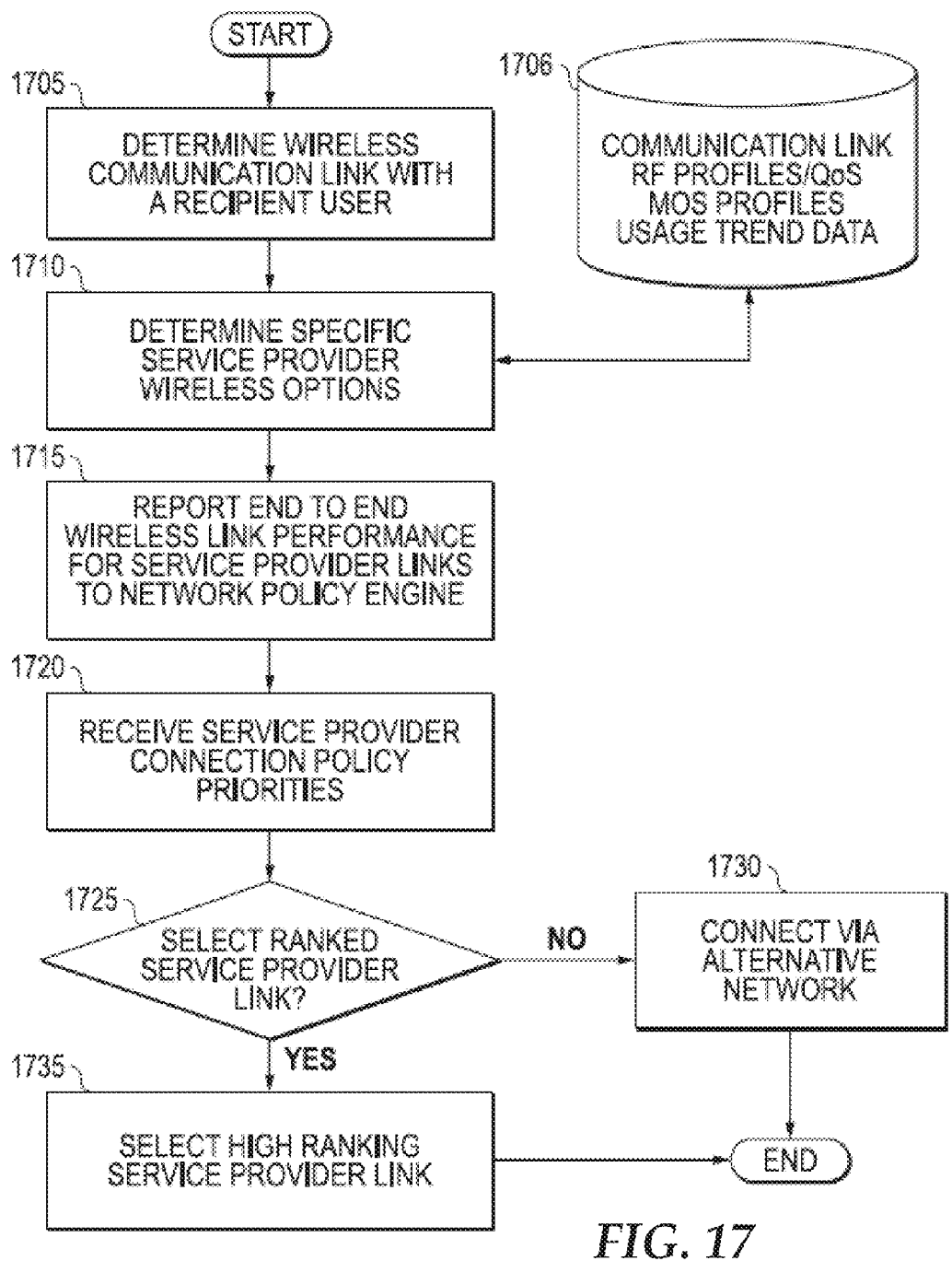
FIG. 17 is an example flow diagram illustrating a method for wireless link ratings feedback to a service provider.

FIG. 17 shows an embodiment of a method for selecting a wireless link from a plurality of wireless communication connection options available from a specific network service provider. In this embodiment, the client mobile information handling systems seeks an end to end connection with a specific recipient user client device. The method also shows utilizing the predicted radio link quality in RF link profiles, MOS scores, and usage trend data in usage profiles a to select, rank or rate optimized wireless links. Rated or ranked optimized wireless links create a policy for switching among one or more selected service provider wireless links by the user mobile client device. This method, in one or more embodiments, may improve communication experience with a network service provider by leveraging the context aware radio resource management system and prediction of radio link quality of service, broadband traffic levels, usage trend data, power consumption, costs, preferences and other factors used to rate available service provider wireless links.

At 1705, a user may select a recipient user to contact to provide for an end to end communication for which selection of a wireless link is required. Proceeding to 1710, network policy interface management system determines what available wireless link options are available from a broadband network service provider. The network policy interface management system invokes the context aware radio resource management system described above to rate and select the wireless links optimal for communication with the recipient user. It is understood, that in other embodiments assessment of a service providers' wireless link options need not be with any specific recipient user, but may be with the user client information handling system and a plurality of connections including connection with the service provider's network gateway. The context aware radio resource management system accesses database 1706 for user profile data, radio frequency link reports, the wireless link radio frequency broadband traffic reports, RF link profile reports including QoS assessments, energy consumption, mobile device path prediction or several other factors in accordance with the several embodiments described. Moreover, the time and location of the initiated communication by the client device may be determined at this point. Future predicted path of the mobile user client information handling system may also be assessed according to some embodiments. The network policy interface management system receives rating of available wireless link connection options and determines the wireless link connection options specific to a network service provider if more than one service providers have been rated.

At 1715, the network policy interface management system reports the end to end wireless link performance rating for one or more service provider wireless links made available to the user client information handling system. In alternative embodiments, specific ratings for QoS, MOS, or other factors may be provided by the network policy interface management system to the network policy engine of the service provider network access control node. In other embodiments, a ranking of wireless links available from a wireless service provider to a user client information handling system is provided.

At 1720, the network policy interface management system may receive service provider network access policy requirements from a network policy engine. This received network access policy requirement may have been revised by the network service provider in response to receiving the end to end wireless link performance report rating one or more available service provider wireless links. In an embodiment such as the LTE EPC, the policy control enforcement function (PCEF) may enforce a policy at 1720, or an EPC operation such as the Access Network Discovery and Selection Function (ANDSF) may provide data about the connectivity and priority of available wireless links of a service provider. Then the PCEF may enforce such a network access policy at a later time when access is initiated. It is appreciated that notification of the service provider network access policies outlining priority for wireless link protocols may occur at any of several points in the flow of FIG. 17. This and any of the method steps of FIG. 17 are not limiting and may occur in any order including the order as shown. The network access policies of a service provider may have been provided earlier in the process and then later revised at 1720, or the revised network access policies may be the first instance of submitting a network access policy from the network policy engine of the control node to the network policy interface management system of the user client information handling system. In some embodiments, the service provider may not elect to revise the network access policy and the received policy may not be revised per se. This is described further with respect to embodiments below.

At decision diamond 1725, the context aware radio resource management system software agent may select a service provider wireless link or select a different wireless service provider. If the context aware radio resource management system does not select a service provider's highly rated wireless link or the service provider fails to permit access via the network access policies, the context aware radio resource management system may proceed to 1730. At 1730, the client user information handling system may connect to a recipient user via an alternative, highly rated wireless link option across a different network. This wireless link may be via a different broadband service provider.

If, however, the context aware radio resource management system software agent selects a highly rated service provider wireless link, the flow proceeds to 1735 whereby the context aware radio resource management system requests access to the wireless link. Upon authentication, the wireless adapter may initiate communication with a recipient user on the selected service provider wireless link. At this point the flow ends.

It is appreciated that variations on the above flow are contemplated including that the order of the methodology performed may vary in any order from that described. It is also contemplated that in certain embodiments, a specific recipient user may not be necessarily selected. In those embodiments, the service provider wireless link ratings may be provided without an initiated network access request, but instead ratings feedback may be provided based on historical communication experiences to improve quality of wireless link priorities set for the network access policies of a service provider during future communications. In yet other embodiments, a link between a service provider access control node network policy engine and network intelligence reports of a virtualized database containing network intelligence report such as crowd-sourced data may not require data from any specific client device. Such data access to the context aware radio resource management systems described above may be used to provide ratings for wireless links of a service provider. Although less specific to a particular user attempting to access a service provider's network, this data may nonetheless be used to improve the network access policies set forth by the service provider for locations and times of day for communication.

Figure 18:
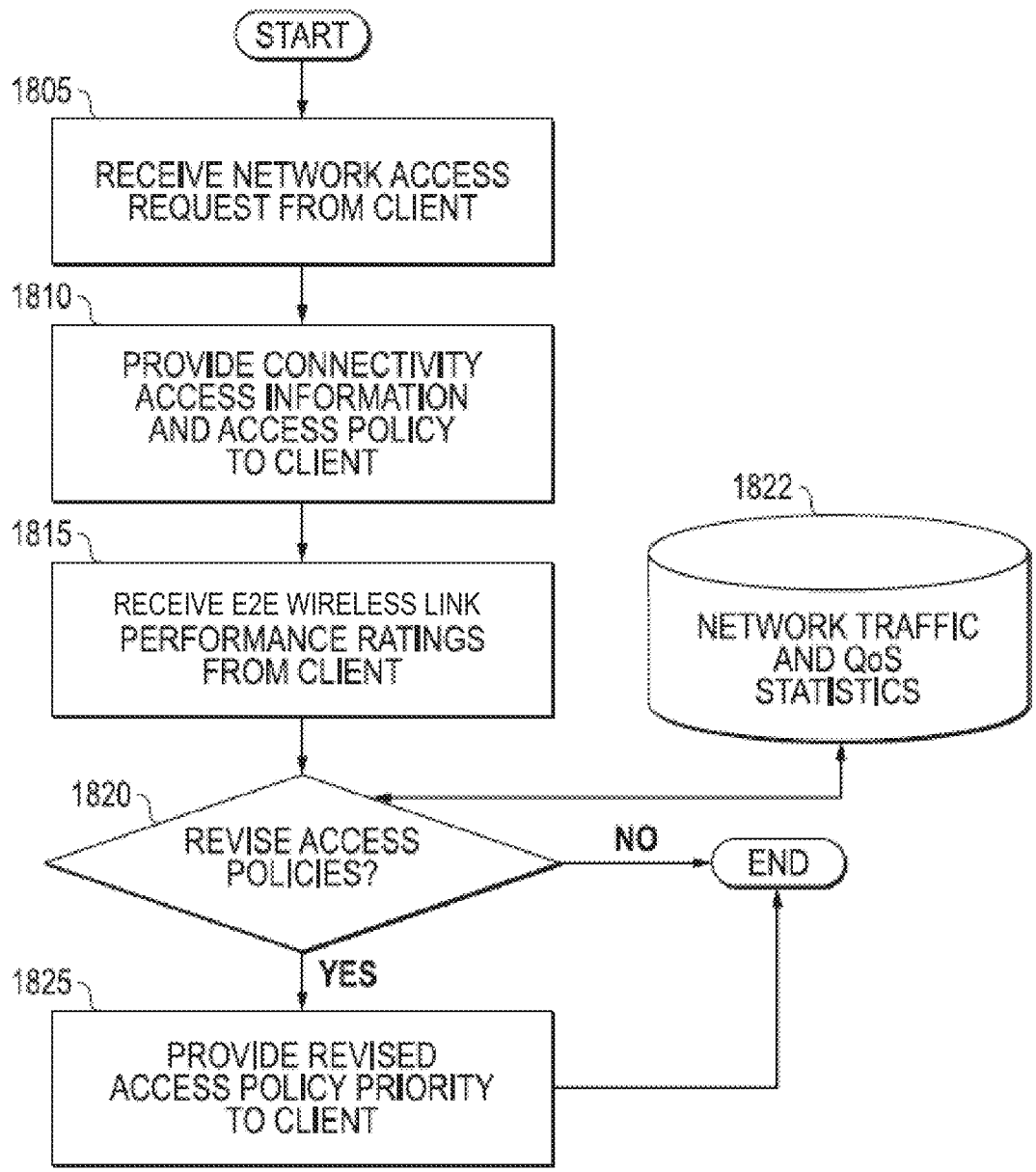
FIG. 18 is another example flow diagram illustrating a method for wireless link ratings feedback for a service provider.

FIG. 18 shows an embodiment of a method for adjusting network access policies at a broadband network service provider access control node in view of service provider wireless link ratings received from a context aware radio resource management system as described in several above embodiments. In some embodiments, the context aware radio resource management system may simply access historical crowd sourced records or network-wide data relating to available service provider wireless links. This method in one or more embodiments may improve communication experience with a network service provider by leveraging the context aware radio resource management system and prediction of radio link quality of service, broadband traffic levels, usage trend data, power consumption, costs, preferences and other factors to rate available service provider wireless links. This may, according to embodiments herein, influence the network access policies enforced by the service provider with respect to one or more user client information handling systems at a given location, time, and device status for a communication.

In one embodiment, a service provider gateway access control node receives an end to end connection access request from a client mobile information handling systems at 1805. Proceeding to 1810, the access control node may provide information relating to connectivity and network discovery as well as the service provider's network access policies and rules relating to priority of service provider wireless link protocols. In an embodiment such as LTE and EPC, this information may be provided by ANDSF. The network access policies may be enforced by a network policy engine of the access control node. In an LTE/EPC embodiment, the network policy engine is the PCEF enforcement function working in connection with the policy and charging control of MME.

At 1815, a network policy interface management system of a client mobile device or of a server storing network intelligence reports from context aware radio resource management systems provides ratings or rankings of available service provider wireless link options. The service provider wireless link performance ratings are based on predicted radio link quality, MOS scores, and usage trend data and other factors as outlined above.

Upon receiving the end to end wireless link ratings for the service provider, the flow proceeds to 1820 where the policy and charging control may be influenced at the access control node, such as MME, to revise the network access policy of the service provider. If no revision is determined as necessary, then the process ends. Whether revision to the network access policies is necessary at 1820 takes into account the service providers own network traffic and QoS statistics 1822. In some example embodiments, revision of the network access policies may simply adopt the order or prioritize one or more highly rated wireless links recommended by the context aware radio resource management system. In other embodiments, decision to revise the network access policies may take into account data relating to factors of wireless link cost, or link performance, or even ignore the recommendations and ratings of the context aware radio resource management system. If network access policies are not to be revised in response to wireless link ratings feedback, the process ends. If revision is determined to be warranted, then the flow proceeds to 1825. At 1825, the revised network access policies are provided to the client user information handling system and enforced as such until further revision is warranted.

The methods described herein may again be performed in any order or with or without certain steps. Service provider wireless link performance ratings feedback may not necessarily need to be provided in response to a network access request from a specific client. Instead, historical performance data may be used to create a rating. The service provider network policy engine and network access control node may directly link to a system having network intelligence reports providing end to end crowd sourced ratings on service provider's wireless link offerings. These end to end wireless link performance ratings may serve to influence network access policies deployed by network access control nodes at one or more service providers.

Figure 19:
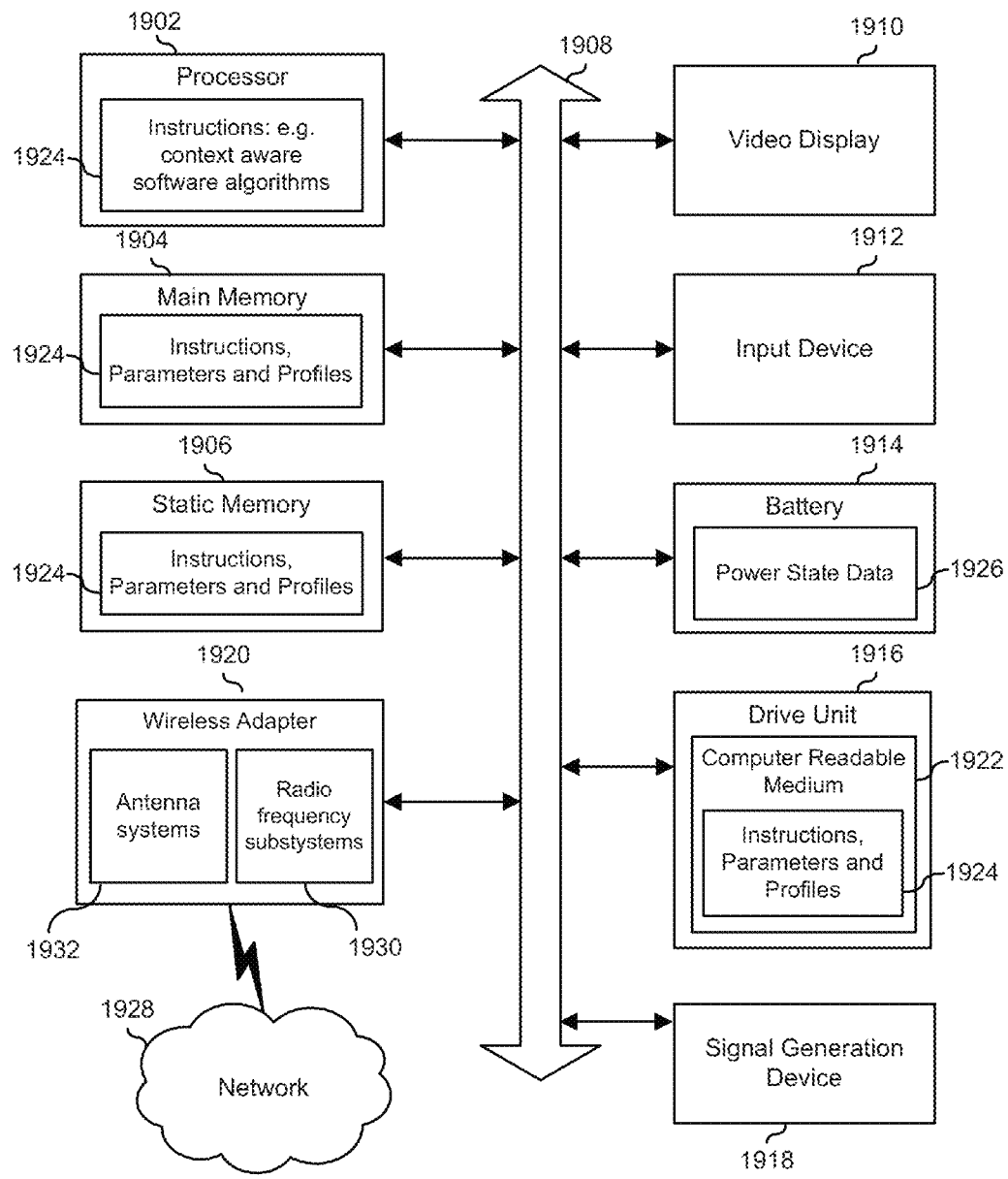
FIG. 19 is a block diagram illustrating an information handling system according to an embodiment of the present disclosure.

FIG. 19 shows an information handling system 1900 capable of administering each of the specific embodiments of the present disclosure. The information handling system 1900 can represent the user information handling systems 110, 120, and 130 or servers or systems located anywhere within network 100 of FIG. 1, including the remote data center 186 operating the virtual machine applications described herein. The information handling system 1900 may include a processor 1902 such as a central processing unit (CPU), a graphics processing unit (GPU), or both. Moreover, the information handling system 1900 can include a main memory 1904 and a static memory 1907 that can communicate with each other via a bus 1908. As shown, the information handling system 1900 may further include a video display unit 1910, such as a liquid crystal display (LCD), an organic light emitting diode (OLED), a flat panel display, a solid state display, or a cathode ray tube (CRT). Additionally, the information handling system 1900 may include an input device 1912, such as a keyboard, and a cursor control device, such as a mouse. The information handling system may include a power source such as battery 1914 or an A/C power source. The information handling system 1900 can also include a disk drive unit 1916, and a signal generation device 1918, such as a speaker or remote control. The information handling system 1900 can include a network interface device such as a wireless adapter 1920. The information handling system 1900 can represent a server device whose resources can be shared by multiple client devices, or it can represent an individual client device, such as a desktop personal computer, a laptop computer, a tablet computer, or a mobile phone.

The information handling system 1900 can include a set of instructions 1924 that can be executed to cause the computer system to perform any one or more of the methods or computer based functions disclosed herein. For example, instructions 1924 may execute the context aware radio resource management system disclosed herein. In a further example, processor 1902 may conduct processing of wireless service usage by the information handling system 1900 according to the systems and methods disclosed herein. The computer system 1900 may operate as a standalone device or may be connected such as using a network, to other computer systems or peripheral devices.

In a networked deployment, the information handling system 1900 may operate in the capacity of a server or as a client user computer in a server-client user network environment, or as a peer computer system in a peer-to-peer (or distributed) network environment. The information handling system 1900 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1900 can be implemented using electronic devices that provide voice, video or data communication. Further, while a single information handling system 1900 is illustrated, the term "system" shall also be taken to include any collection of systems or sub-systems that individually or jointly execute a set, or multiple sets, of instructions to perform one or more computer functions.

The disk drive unit 1916 may include a computer-readable medium 1922 in which one or more sets of instructions 1924 such as software can be embedded. The disk drive unit 1919 also contains space for data storage. Further, the instructions 1924 may embody one or more of the methods or logic as described herein. For example, instructions relating to the context aware radio resource management software algorithms may be stored here. Additionally, parameters and profiles relating to context aware radio resource management system may be stored here. Parameters may include communication and efficiency rules or data relating to device-specific capabilities. Profiles stored here may include end-user profile data measured by the processor 1902 during wireless service usage processing. Profiles may additionally include crowd source spatial-temporal radio frequency profiles for wireless links or energy link consumption data. In a particular embodiment, the instructions, parameters, and profiles 1924 may reside completely, or at least partially, within the main memory 1904, the static memory 1907, and/or within the processor 1902 during execution by the information handling system 1900. The main memory 1904 and the processor 1902 also may include computer-readable media. Battery 1914 may include a smart battery system that tracks and provides power state data 1926. This power state data may be stored with the instructions, parameters, and profiles 1924 to be used with the systems and methods disclosed herein.

The network interface device shown as wireless adapter 1920 can provide connectivity to a network 1928, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 1920 may include one or more radio frequency subsystems 1930 with transmitter/receiver circuitry, wireless controller circuitry, amplifiers and other circuitry for wireless communications. Each radiofrequency subsystem 1930 may communicate with one or more wireless technology protocols. The radiofrequency subsystem 1930 may contain individual subscriber identity module (SIM) profiles for each technology service provider and their available protocols. Alternatively it may have a software based SIM profile that is reconfigurable. The wireless adapter 1920 may also include antenna system 1932 which may be tunable antenna systems for use with the system and methods disclosed herein.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 1924 or receives and executes instructions, parameters, and profiles 1924 responsive to a propagated signal; so that a device connected to a network 1928 can communicate voice, video or data over the network 1928. Further, the instructions 1924 may be transmitted or received over the network 1928 via the network interface device or wireless adapter 1920.

Information handling system 1900 includes one or more application programs 1924, and Basic Input/Output System and firmware (BIOS/FW) code 1924. BIOS/FW code 1924 functions to initialize information handling system 1900 on power up, to launch an operating system, and to manage input and output interactions between the operating system and the other elements of information handling system 1900. In a particular embodiment, BIOS/FW code 1924 reside in memory 1904, and include machine-executable code that is executed by processor 1902 to perform various functions of information handling system 1900. In another embodiment (not illustrated), application programs and BIOS/FW code reside in another storage medium of information handling system 1900. For example, application programs and BIOS/FW code can reside in drive 1916, in a ROM (not illustrated) associated with information handling system 1900, in an option-ROM (not illustrated) associated with various devices of information handling system 1900, in storage system 1907, in a storage system (not illustrated) associated with network channel 1920, in another storage medium of information handling system 1900, or a combination thereof. Application programs 1924 and BIOS/FW code 1924 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a wireless adapter for communicating with a network policy engine at a service provider to transmit feedback on a network access policy of the service provider pursuant to instructions of an application processor;
the application processor executing instructions of a context aware radio resource management system for determining one or more optimal wireless link options for establishing communication between the information handling system and a recipient user via a wireless link from among communication link options available from the service provider by rating wireless link options from among a plurality of available service provider wireless links for communication between the information handling system and the recipient user, wherein the rating is based on a spatial-temporal radio frequency profile indicating signal quality for the service provider wireless link options between the information handling system and a recipient user and a user profile comprising wireless service usage trend data for a location of the information handling system; and
the application processor executing instructions of a network policy interface management system transmitting via the wireless adapter at least one service provider wireless link rating from among the rated service provider wireless links to the network policy engine at the service provider.

2. The system of claim 1, wherein the context aware radio resource management system receives a crowd-sourced spatial-temporal radio frequency profile to determine a ranked list of service provider wireless links.

3. The system of claim 1, wherein the network policy interface management system reports end to end service provider wireless link performance ratings for at least one service provider wireless link between the information handling system and the recipient user.

4. The system of claim 1, wherein the application processor determines a rank of service provider wireless links based on anticipated radio link QoS for locations along a predicted future information handling system path.

5. The system of claim 1, wherein the spatial-temporal radio frequency profile indicating signal quality further comprises end to end latency data for service provider wireless links available at the location.

6. The system of claim 1, wherein the network policy interface management system reports mean opinion scores (MOS) of at least one service provider wireless link to the network policy engine of the service provider.

7. The system of claim 1, wherein network policy interface management system is further adapted to:
determine if a service provider wireless link is available in the location; and
select a highly-rated service provider wireless link ahead of alternative available service provider wireless links for communication with the recipient user.

8. The system of claim 1, wherein the network policy engine of the service provider is a policy control enforcement function engine (PCEF).

9. The system of claim 1, wherein in response to transmitting the at least one service provider wireless link rating, the application processor receives data from the network policy engine indicating a change in the network access policy.

10. A computer implemented method comprising:
communicating, via a wireless adapter at a mobile information handling system, with a network policy engine at a service provider to provide feedback on a network access policy of the service provider;
executing, via an application processor, instructions of a network policy interface management system for determining one or more optimal wireless link options for communicating between the mobile information handling system and a recipient user via a wireless link from among communication link options available from the service provider including:
rating the service provider wireless link options from among a plurality of available service provider wireless links for communication between the mobile information handling system and the recipient user, wherein the rating is based on a mobile broadband traffic report comprising a spatial-temporal radio frequency profile indicating signal quality for the service provider wireless link options between the information handling system and a recipient user and a user profile comprising wireless service usage trend data for a location of a first user information handling system; and
transmitting at least one service provider wireless link rating from among the rated service provider wireless links to the network policy engine at the service provider.

11. The method of claim 10, further comprising:
reporting end to end service provider wireless link performance between the first user information handling system and the recipient user for at least one service provider wireless link.

12. The method of claim 10, further comprising:
receiving data from the network policy engine of the service provider indicating a change in the network access policy priority in response to transmitting the at least one service provider wireless link rating.

13. The method of claim 10, further comprising:
selecting a highly-rated service provider wireless link for communication with the recipient user wherein the selection is further based a revision of the network access policy received from the network policy engine of the service provider.

14. The method of claim 10, wherein the spatial-temporal radio frequency profile indicating signal quality further comprises data indicating power consumption for wireless services across the wireless link.

15. A service provider gateway information handling system comprising:
an application processor executing instructions for a network policy engine to establish service provider network access policy including network connection priorities;
a control node for controlling access to one or more service provider wireless links via a network gateway;
a wireless adapter receiving an end to end service provider wireless link performance report for a plurality of service provider wireless links between a first user information handling system requesting access and a recipient user;
the application processor to re-prioritize the service provider network access policy regarding service provider wireless links available to the first user information handling system in a location;
wherein the end to end service provider wireless link performance report is based on a spatial-temporal radio frequency profiles indicating signal quality for the plurality of wireless links available between a first user information handling system requesting access and a recipient user and a spatial-temporal user profile comprising wireless service usage trend data for the first user information handling system at the location.

16. The system of claim 15, wherein the end to end service provider wireless link performance report is further based on a crowd-sourced spatial-temporal radio frequency profile.

17. The system of claim 15, wherein the end to end service provider wireless link performance report includes crowd sourced mean opinion score (MOS) data for available service provider wireless links.

18. The system of claim 15, wherein the end to end service provider wireless link performance report includes a ranking of available service provider wireless links for the first user information handling system.

19. The system of claim 15, wherein network policy engine of the service provider is a policy control enforcement function engine (PCEF).

20. The system of claim 15, wherein network policy engine of the service provider elects not to re-prioritize the network access policy in response to receiving the end to end service provider wireless link performance report.

* * * * *